(12) United States Patent
Bakulin et al.

(10) Patent No.: US 10,581,659 B2
(45) Date of Patent: *Mar. 3, 2020

(54) SYSTEM AND METHOD FOR COMMUNICATIONS WITH REDUCED PEAK TO AVERAGE POWER RATIO

(71) Applicant: Huawei Technologies Co., Ltd., Shenzhen (CN)

(72) Inventors: Mikhail Germanovich Bakulin, Moskovskaya obl. (RU); Gennady Vladimirovich Ovechkin, Ryazan (RU); Vitaly Borisovich Kreyndelin, Moscow (RU); Javad Abdoli, Kanata (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/124,615

(22) Filed: Sep. 7, 2018

(65) Prior Publication Data

US 2019/0020520 A1 Jan. 17, 2019

Related U.S. Application Data

(63) Continuation of application No. 15/415,442, filed on Jan. 25, 2017, now Pat. No. 10,075,315.

(51) Int. Cl.
*H04L 27/26* (2006.01)
*H04B 7/0456* (2017.01)
(Continued)

(52) U.S. Cl.
CPC ........... *H04L 27/2615* (2013.01); *H04B 1/69* (2013.01); *H04B 7/0465* (2013.01); *H04J 13/00* (2013.01); *H04L 25/03936* (2013.01)

(58) Field of Classification Search
CPC ... H04L 27/264; H04L 25/03898; H04B 1/69; H04B 7/0452
See application file for complete search history.

(56) References Cited

U.S. PATENT DOCUMENTS

2011/0179339 A1  7/2011  Rosenqvist
2014/0169408 A1  6/2014  Bayesteh et al.
(Continued)

FOREIGN PATENT DOCUMENTS

CN            105723637 A      6/2016

OTHER PUBLICATIONS

Nikopour, et al., "Sparse Code Multiple Access", 2013 IEEE 24th International Symposium on Personal, Indoor and Mobile Radio Communications: Fundamentals and PHY Track, Sep. 2013, 5 pages.
(Continued)

*Primary Examiner* — David S Huang
(74) *Attorney, Agent, or Firm* — Slater Matsil, LLP

(57) ABSTRACT

A method for transmitting data includes modulating data bits with a constellation to produce modulated data symbols, precoding the modulated data symbols to obtain ns groups of precoded samples, where ns is equal to a number of non-zero terms in a sparse code associated with the transmitting device, mapping the ns groups of precoded samples to groups of subcarriers in accordance with the sparse code associated with the transmitting device, to obtain a plurality of subcarrier-mapped samples, transforming the plurality of subcarrier-mapped samples into encoded data symbols, and transmitting the encoded data symbols.

17 Claims, 13 Drawing Sheets

(51) Int. Cl.
*H04B 1/69* (2011.01)
*H04J 13/00* (2011.01)
*H04L 25/03* (2006.01)

(56) References Cited

U.S. PATENT DOCUMENTS

| | | |
|---|---|---|
| 2016/0050039 A1 | 2/2016 | Ma et al. |
| 2016/0080961 A1 | 3/2016 | Kim et al. |
| 2016/0270042 A1 | 9/2016 | Nikopour et al. |
| 2016/0330265 A1 | 11/2016 | Abdoli et al. |
| 2016/0353446 A1 | 12/2016 | Abdoli et al. |
| 2018/0054334 A1* | 2/2018 | Sun .................. H04L 25/03929 |
| 2019/0223225 A1* | 7/2019 | Lee ........................... H04L 5/00 |

OTHER PUBLICATIONS

"Discussion on Low PAPR Non-Orthogonal Multiple Access", Samsung, 3GPP TSG RAN WG1 Meeting #86bis, R1-1609036, Oct. 2016, 4 pages, Lisbon, Portugal.

Sharp, "Multiple access schemes for NR", 3GPP TSG RAN WG1 Meeting #86, R1-167615, Aug. 22-26, 2016, 8 Pages, Gothenburg, Sweden.

\* cited by examiner

SYSTEM AND METHOD FOR COMMUNICATIONS WITH REDUCED PEAK TO AVERAGE POWER RATIO

This patent application is a continuation of U.S. patent application Ser. No. 15/415,442, filed on Jan. 25, 2017, and entitled "System and Method for Communications with Reduced Peak to Average Power Ratio," of which application is hereby incorporated by reference as if reproduced in its entirety.

TECHNICAL FIELD

The present invention relates generally to a system and method for digital communications, and, in particular embodiments, to a system and method for communications with reduced peak to average power ratio (PAPR).

BACKGROUND

Multiple access schemes allow multiple devices, or user equipments (UEs), to share channel resources. Potential transmit devices are allocated time and frequency resources for example, also referred to as resource units. While various multiple access schemes are available and used in practice, the selection and implementation of the specific multiple access scheme has an important impact on design parameters of the associated communication system.

Peak to average power ratio (PAPR) is an important value to consider in the design of communication systems. PAPR provides an indication of a maximum transmit power level compared to an average transmit power level. A high PAPR indicates that the maximum transmit power level is significantly greater than the average transmit power level, while a low PAPR indicates that the maximum transmit power level is relatively close to the average transmit power level. In order to reduce distortion, a power amplifier should be operating in a linear region for as much of the transmit power range as possible. When the power amplifier is not operating in the linear region, significant distortion may be added, thereby leading to decreased performance. Generally, a power amplifier with a large linear region will cost more than an otherwise similar power amplifier with a narrower linear region. Therefore, reducing the PAPR can result in improved overall communications performance, as well as reduced implementation costs.

SUMMARY

It is desirable to reduce the peak to average power ratio (PAPR) in communications systems employing multiple access, particularly in various non-orthogonal multiple access schemes such as sparse code multiple access (SCMA) for example.

Example embodiments provide a system and method for communications with reduced PAPR.

In accordance with an example embodiment, a method for transmitting data is provided. The method includes modulating, by a transmitting device, data bits with a constellation to produce modulated data symbols, precoding, by the transmitting device, the modulated data symbols to obtain ns groups of precoded samples, where ns is equal to a number of non-zero terms in a sparse code associated with the transmitting device, mapping, by the transmitting device, the ns groups of precoded samples to groups of subcarriers in accordance with a sparse code associated with the transmitting device, to obtain a plurality of subcarrier-mapped samples, transforming, by the transmitting device, the plurality of subcarrier-mapped samples into encoded data symbols, and transmitting, by the transmitting device, the encoded data symbols.

The method also includes applying, by the transmitting device, a phase rotation to the modulated data symbols prior to precoding the modulated data symbols. When ns is greater than one, the applying the phase rotation to the modulated data symbols includes applying ns different phase rotations to the modulated data symbols. When the constellation is a single-dimensional constellation and ns is greater than one, the method also includes replicating, by the transmitting device, the group of precoded samples ns−1 times. The constellation is a p dimensional QAM constellation, where p is an integer equal to ns and ns is greater than one.

The mapping the ns groups of precoded samples to groups of subcarriers includes mapping a j-th group of precoded samples to subcarriers corresponding to a SCMA resource associated with a j-th non-zero term in the sparse code associated with the transmitting device. The subcarriers corresponding to the SCMA resource are a k-th group of consecutive subcarriers mapped to the SCMA resource associated with the j-th non-zero term.

In accordance with some further example embodiments, each group of precoded samples are mapped to a group of consecutive subcarriers according to both each user device's sparse code pattern and to a subcarrier mapping common to the user devices. By mapping the groups of precoded samples to SCMA resources, and then mapping the SCMA resources to groups of consecutive subcarriers, the communications system may exhibit reduced PAPR.

In accordance with an example embodiment, a method for receiving data is provided. The method includes transforming, by a receiving device, data symbols received from a plurality of transmitting devices into a plurality of subcarrier samples, equalizing, by the receiving device, SCMA resources formed from the plurality of subcarrier samples, decoding, by the receiving device, SCMA codewords generated from the equalized SCMA resources to produce data bits associated with transmitting devices in the plurality of transmitting devices, and processing, by the receiving device, the data bits.

The equalizing of the SCMA resources includes applying a weighting matrix to the subcarrier samples associated with the SCMA resources. The decoding the SCMA codewords includes applying a message passing algorithm (MPA) to the SCMA codewords.

In accordance with an example embodiment, a transmitting device is provided. The transmitting device includes a processor, and a computer readable storage medium storing programming for execution by the processor. The programming including instructions to configure the transmitting device to modulate data bits with a constellation to produce modulated data symbols, precode the modulated data symbols to obtain ns groups of precoded samples, where ns is equal to a number of non-zero terms in a sparse code associated with the transmitting device, map the ns groups of precoded samples to groups of subcarriers in accordance with a sparse code associated with the transmitting device, to obtain a plurality of subcarrier-mapped samples, transform the plurality of subcarrier-mapped samples into encoded data symbols, and transmit the encoded data symbols.

The programming includes instructions to configure the transmitting device to apply a phase rotation to the modulated data symbols prior to precoding the modulated data symbols. The programming includes instructions to configure the transmitting device to apply ns different phase rotations to the modulated data symbols when ns is greater than one. When the constellation is a single-dimensional constellation and ns is greater than one, the programming includes instructions to configure the transmitting device to replicate the group of precoded samples ns−1 times. The constellation is a p dimensional QAM constellation, where p is an integer equal to ns and ns is greater than one.

The programming includes instructions to configure the transmitting device to map a j-th group of precoded samples to subcarriers corresponding to a SCMA resource associated with a j-th non-zero term in the sparse code associated with the transmitting device. The subcarriers corresponding to the SCMA resource are a k-th group of consecutive subcarriers mapped to the SCMA resource associated with the j-th non-zero term.

In accordance with an example embodiment, a receiving device is provided. The receiving device includes a processor, and a computer readable storage medium storing programming for execution by the processor. The programming including instructions to configure the receiving device to transform data symbols received from a plurality of transmitting devices into a plurality of subcarrier samples, equalize SCMA resources formed from the plurality of subcarrier samples, decode SCMA codewords generated from the equalized SCMA resources to produce data bits associated with transmitting devices in the plurality of transmitting devices, and process the data bits.

The programming includes instructions to configure the receiving device to apply a weighting matrix to the subcarrier samples associated with the SCMA resources. The programming includes instructions to configure the receiving device to apply an MPA to the SCMA codewords.

In accordance with an example embodiment, a method for transmitting data is provided. The method includes modulating, by a transmitting device, data bits with a constellation to produce modulated data symbols, precoding, by the transmitting device, the modulated data symbols to obtain ns groups of precoded samples, where ns is equal to a number of non-zero terms in a sparse code associated with a user device, mapping, by the transmitting device, the ns groups of precoded samples to groups of subcarriers in accordance with the sparse code associated with the user device, to obtain a plurality of subcarrier-mapped samples, transforming, by the transmitting device, the plurality of subcarrier-mapped samples into encoded data symbols, and transmitting, by the transmitting device, the encoded data symbols.

Practice of the foregoing embodiments enables the reduction of the PAPR of non-orthogonal multiple access schemes such as multi-carrier sparse code multiple access (SCMA), thereby enabling improved overall communications system performance and reduced implementation costs.

BRIEF DESCRIPTION OF THE DRAWINGS

For a more complete understanding of the present disclosure, and the advantages thereof, reference is now made to the following descriptions taken in conjunction with the accompanying drawings, in which.

DETAILED DESCRIPTION OF ILLUSTRATIVE EMBODIMENTS

Figure 1A:
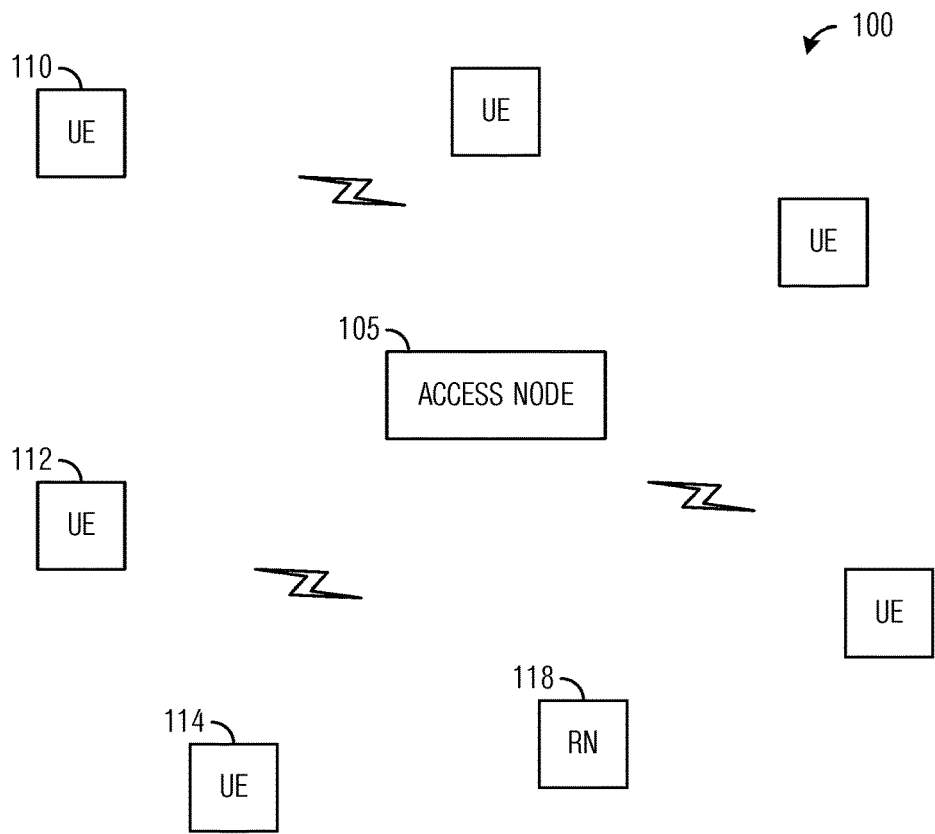
FIG. 1A illustrates an example communications system according to example embodiments described herein.

The making and using of the presently example embodiments are discussed in detail below. It should be appreciated, however, that the present disclosure provides many applicable inventive concepts that can be embodied in a wide variety of specific contexts. The specific embodiments discussed are merely illustrative of specific ways to make and use the embodiments, and do not limit the scope of the disclosure.

The embodiments will be described with respect to example embodiments in a specific context, namely communications systems that use Sparse Code Multiple Access (SCMA); however, it would be understood by persons skilled in the art that the specific solutions described in the examples herein are applicable to other non-orthogonal multiple access schemes. The embodiments may be applied to standards compliant communications systems, such as those that are compliant with technical standards, such as Third Generation Partnership Project (3GPP) Long Term Evolution (LTE), IEEE 802.11, and the like, as well as non-standards compliant communications systems, that use SCMA and other non-orthogonal multiple access schemes.

SCMA is a non-orthogonal multiple access scheme that allows multiple devices, or user equipments (UEs), to share channel resources. Potential transmit devices are allocated time and frequency resources, also referred to as resource units. In SCMA, potential transmit devices are also assigned a sparse codebook that allows superposition of device transmissions, which allows SCMA systems to support a greater number of connected devices.

In SCMA, data is spread over multiple time-frequency resource units, for example tones of orthogonal frequency division multiple access (OFDMA) resources, through single-dimensional or multi-dimensional codewords. In different variations of SCMA, the data may be spread over resource units of code division multiple access (CDMA), OFDM, filter bank multicarrier (FBMC), filtered OFDM, and the like. Sparsity of codewords helps to reduce the complexity of joint detection of multiplexed SCMA layers by using message passing algorithm (MPA) decoders. In general, each layer of SCMA signals has its specific codebook.

Furthermore, in the multi-dimensional implementation, the increased shaping gain and coding gain realized with the use of multi-dimensional constellations are advantages of SCMA. The shaping and coding gains are usually greater for higher order modulations.

SCMA is an encoding technique that encodes data streams, such as binary data streams, or in general, Q-ary data streams, where Q is an integer number greater than or equal to 2, into single-dimensional or multi-dimensional codewords. The dimensions refer to time and/or frequency dimensions and resource units therein, which are used to convey independent symbols.

SCMA directly encodes the data stream into codewords and circumvents QAM symbol mapping, which may lead to coding gain. Notably, SCMA encoding techniques convey data streams using a codeword rather than a QAM symbol. SCMA uses a SCMA codebook to encode the data stream into codewords. The SCMA codebook is an example of a spread constellation. The spread constellation, which may also be referred to as a spread modulation map, is achieved by applying a spreading sequence to a constellation. The constellation may also be referred to as a modulation map. The spreading sequence may also be referred to as a signature.

Additionally, SCMA encoding provides multiple-access through the use of different codebooks for different multiplexed layers, as opposed to the use of different spreading sequences for different multiplexed layers. Furthermore, SCMA encoding typically uses codebooks with sparse codewords that enable receivers to use low complexity algorithms, such as message passing algorithms (MPA), to detect individual codewords from combined codewords received by the receiver, thereby reducing processing complexity in the receivers.

CDMA is a multiple access technique in which data symbols are spread out over orthogonal and/or near-orthogonal code sequences. Conventional CDMA encoding is a two-step process in which a binary code is mapped to a QAM symbol before a spreading sequence is applied. Although conventional CDMA encoding can provide relatively high data rates, new techniques/mechanisms for achieving even higher data rates are needed to meet the ever-growing demands of next-generation wireless networks.

SCMA uses a codebook-based non-orthogonal multiplexing technique realized by super-imposing codewords selected from SCMA codebooks. Instead of spreading QAM symbols, coded bits are directly mapped to sparse complex codewords. One further benefit of SCMA codebooks is the shaping gain and coding gain made possible by implementations using multi-dimensional constellations. SCMA is classified as a waveform/modulation and multiple-access scheme. SCMA codewords are laid over multiple channel resource units, for example multi-carrier tones of OFDM. In SCMA, the combining of data for a plurality of UEs onto a plurality of resource units when the number of UEs is greater than the number of resource units is known as data overloading. Data overloading is achievable with moderate increase in detection complexity due to the sparsity of SCMA codewords. As a result of data overloading, some resource units contain data for more than one UE.

FIG. 1A illustrates an example communications system 100. Communications system 100 supports SCMA communications. Communications system 100 includes an access node 105. Communications system 100 also includes user equipment (UE), such as UE 110, UE 112, and UE 114. Access node 105 includes multiple transmit antennas and multiple receive antennas to support multiple input multiple output (MIMO) operation, wherein a single access node (or transmit node) simultaneously transmits multiple data streams to multiple UEs, or to UEs with multiple data streams per UE, or a combination thereof. Similarly, the UEs may include multiple transmit antennas and multiple receive antennas to support MIMO operation. In general, an access node may also be referred to as an evolved NodeB (eNB), NodeB, a base station, a controller, an access point, and the like. Similarly, a UE may also be referred to as a mobile station, a mobile, a terminal, a subscriber, and the like. Communications system 100 may also include a relay node (RN) 118 that is capable of utilizing a portion of the network resources controlled by access node 105 and allocated to RN 118 to enable RN 118 to help improve coverage and/or overall performance of communications system 100. As an example, access node 105 allocates a subset of the network resources to RN 118, and RN 118 acts as an intermediary by receiving and forwarding messages using the allocated network resources to extend the coverage area of access node 105 or to provide coverage in a coverage hole present in the coverage area of access node 105.

Although it is understood that communications systems may employ multiple access nodes capable of communicating with a number of UEs, only one access node, one RN, and six UEs are illustrated for simplicity.

Figure 1B:
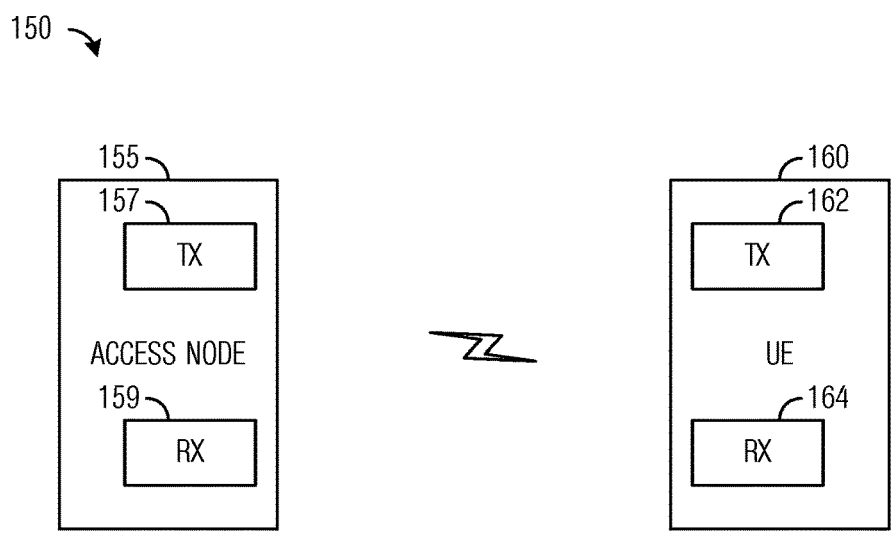
FIG. 1B illustrates an example communications system, highlighting a communicating access node—UE pair.

FIG. 1B illustrates an example communications system 150, highlighting a communicating access node—UE pair. The communications system 150 includes an access node 155 and a UE 160 that are communicating. Access node 155 includes a transmitter 157 and a receiver 159, while UE 160 includes a transmitter 162 and a receiver 164. Uplink communications are communications from transmitter 162 of UE 160 to receiver 159 of access node 155, and downlink communications are communications from transmitter 157 of access node 155 to receiver 164 of UE 160.

SCMA-OFDM is a code-domain multiplexing scheme over multicarrier modulation in which the spreading codebooks are sparse and because detection complexity is a function of the sparsity of the spreading codebooks, detection can be simpler. The wide range of configurable communications system parameters, such as spreading factor, sparsity of codebooks, and number of the maximum SCMA multiplexed layers, indicate the flexibility of SCMA.

Figure 2:
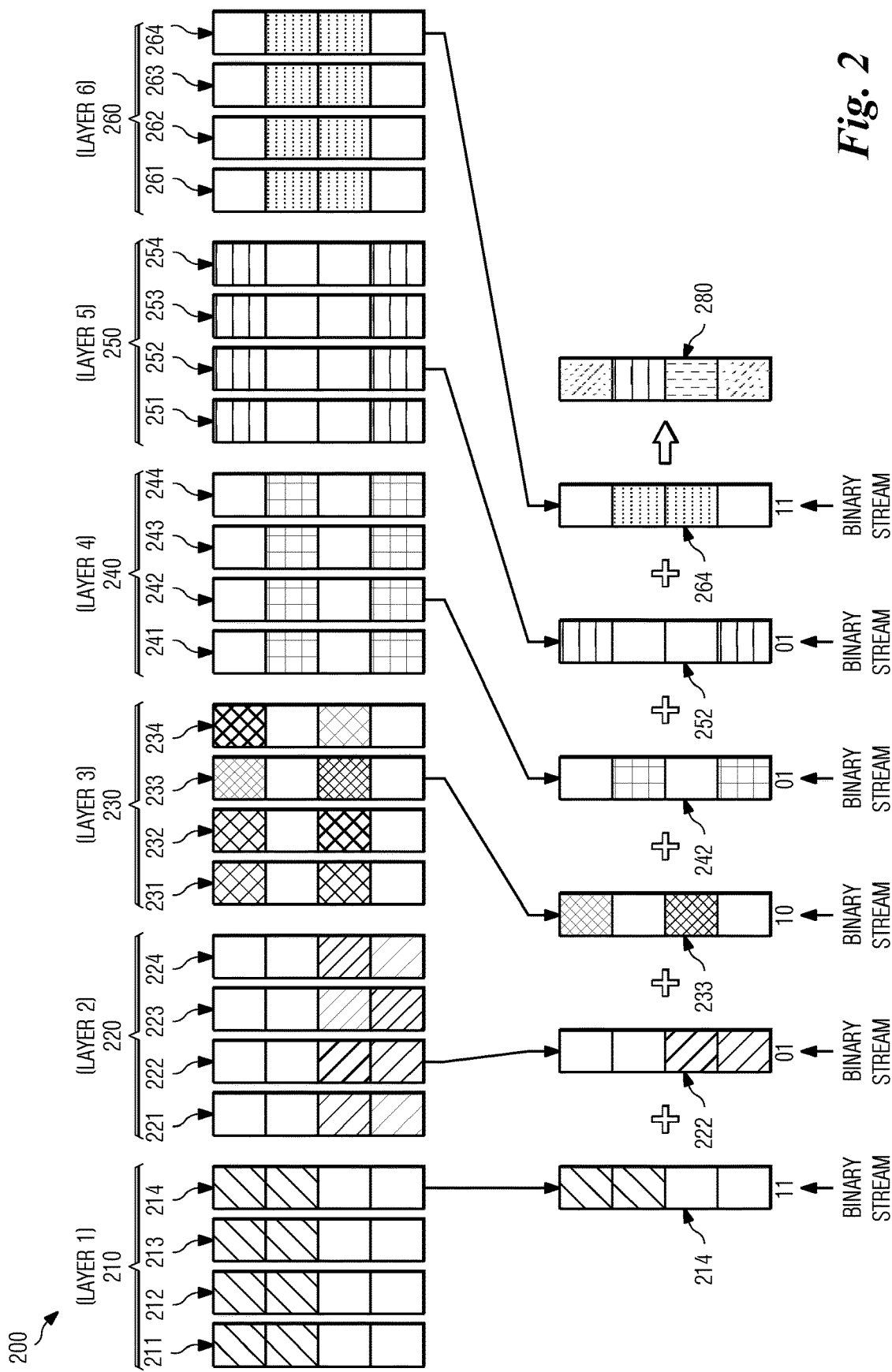
FIG. 2 illustrates an example SCMA multiplexing scheme for encoding data according to example embodiments described herein.

FIG. 2 illustrates an example SCMA multiplexing scheme 200 for encoding data. As shown in FIG. 2, SCMA multiplexing scheme 200 may utilize a plurality of codebooks 210, 220, 230, 240, 250, and 260. Each codebook of the plurality of codebooks is assigned to a different multiplexed layer. Each codebook includes a plurality of multidimensional codewords. More specifically, codebook 210 includes codewords 211-214, codebook 220 includes codewords 221-

224, codebook 230 includes codewords 231-234, codebook 240 includes codewords 241-244, codebook 250 includes codewords 251-254, and codebook 260 includes codewords 261-264.

Each codeword of a respective codebook may be associated with a different data value, for example one or more binary bits. In other words, one or more binary bits may be mapped to a codeword of a particular codebook. As an illustrative example, the codewords 211, 221, 231, 241, 251, and 261 are associated with binary value '00', the codewords 212, 222, 232, 242, 252, and 262 are associated with the binary value '00', the codewords 213, 223, 233, 243, 253, and 263 are associated with the binary value '10', and the codewords 214, 224, 234, 244, 254, and 264 are associated with the binary value '11'. It is noted that although the codebooks in FIG. 2 are depicted as having four codewords each, SCMA codebooks in general may have any number of codewords. As an example, SCMA codebooks may have 8 codewords (e.g., associated with binary values '000' . . . '111'), 16 codewords (e.g., associated with binary values '0000' . . . '1111'), or more.

As shown in FIG. 2, different codewords are selected from various codebooks 210, 220, 230, 240, 250, and 260 depending on the binary data being transmitted over the multiplexed layer. In this example, codeword 214 is selected from codebook 210 because the binary value '11' is being transmitted over the first multiplexed layer, codeword 222 is selected from codebook 220 because the binary value '01' is being transmitted over the second multiplexed layer, codeword 233 is selected from codebook 230 because the binary value '10' is being transmitted over the third multiplexed layer, codeword 242 is selected from codebook 2400 because the binary value '01' is being transmitted over the fourth multiplexed layer, codeword 252 is selected from codebook 250 because the binary value '01' is being transmitted over the fifth multiplexed layer, and codeword 264 is selected from codebook 260 because the binary value '11' is being transmitted over the sixth multiplexed layer. Codewords 214, 222, 233, 242, 252, and 264 may then be multiplexed together to form multiplexed data stream 280, which is transmitted over shared resources of a network. Notably, codewords 214, 222, 233, 242, 252, and 264 are sparse codewords, and therefore can be identified upon reception of multiplexed data stream 280 using a low complexity algorithm, such as a message passing algorithm (MPA), or a turbo decoder.

Figure 3:
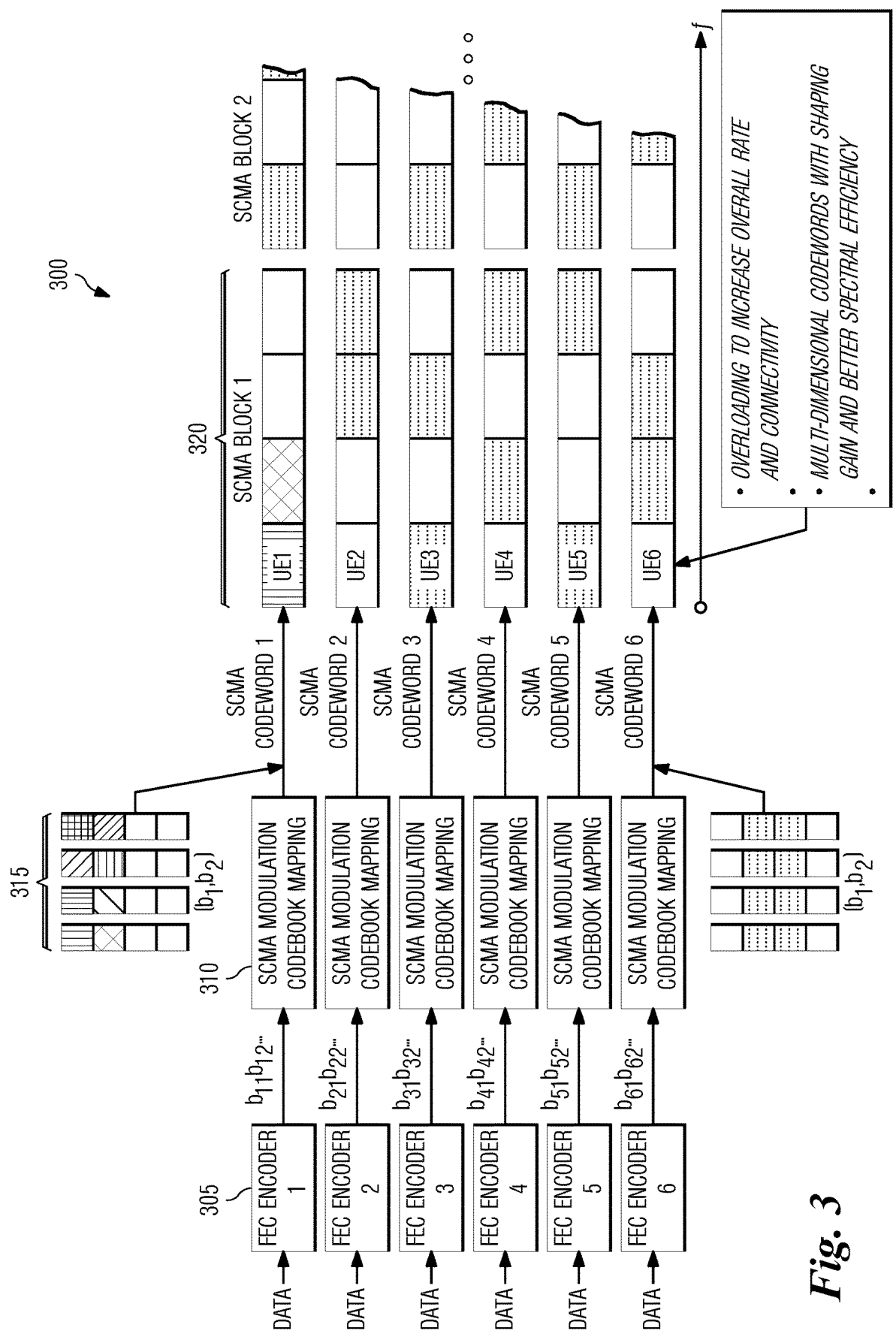
FIG. 3 illustrates a diagram of example SCMA blocks and an example process of data being modulated with example SCMA codebooks to fill SCMA blocks according to example embodiments described herein.

FIG. 3 illustrates a diagram 300 of example SCMA blocks and an example process of data being modulated with example SCMA codebooks to fill SCMA blocks. As discussed previously, SCMA codebooks are examples of spread modulation maps. Data to be transmitted is provided to FEC encoders, such as FEC encoder 305, to produce encoded data for different UEs. The data for different UEs is provided to SCMA modulation codebook mapping units, such as SCMA modulation codebook mapping unit 310, to produce SCMA codewords, such as SCMA codewords 315. SCMA codewords are arranged into SCMA block 320.

Single carrier frequency division multiple access (SC-FDMA) is a frequency division multiple access scheme. SC-FDMA is used in uplink transmissions of 3GPP LTE compliant communications systems. SC-FDMA offers lower PAPR, benefiting transmit power efficiency and reduced implementation cost, namely simpler power amplifiers with smaller linear regions.

According to an example embodiment, SCMA and SC-FDMA are combined to offer good multi-user performance with reduced PAPR, which helps to improve transmit power efficiency and reduced implementation costs. The combination of SCMA and SC-FDMA is referred to herein as a combined SCMA/SC-FDMA multiple access technique. SCMA supports non-orthogonal multiple access with enhanced spectrum efficiency, lower latency, and lower signaling overhead. SCMA also supports data overloading. The sparsity present in SCMA codewords limits detection complexity. SC-FDMA reduces PAPR, which benefits transmit power efficiency and reduced implementation cost.

According to an example embodiment, a group of subcarriers, which are ordinarily used by a single user in SC-FDMA, are used as a common SCMA resource. Data for a user is mapped to multiple groups of subcarriers in accordance with a sparse code associated with the user. Data for multiple users are mapped to the multiple groups of subcarriers in accordance with sparse codes associated with each user, permitting multiple users to share the multiple groups of subcarriers.

Figures 4, 9:
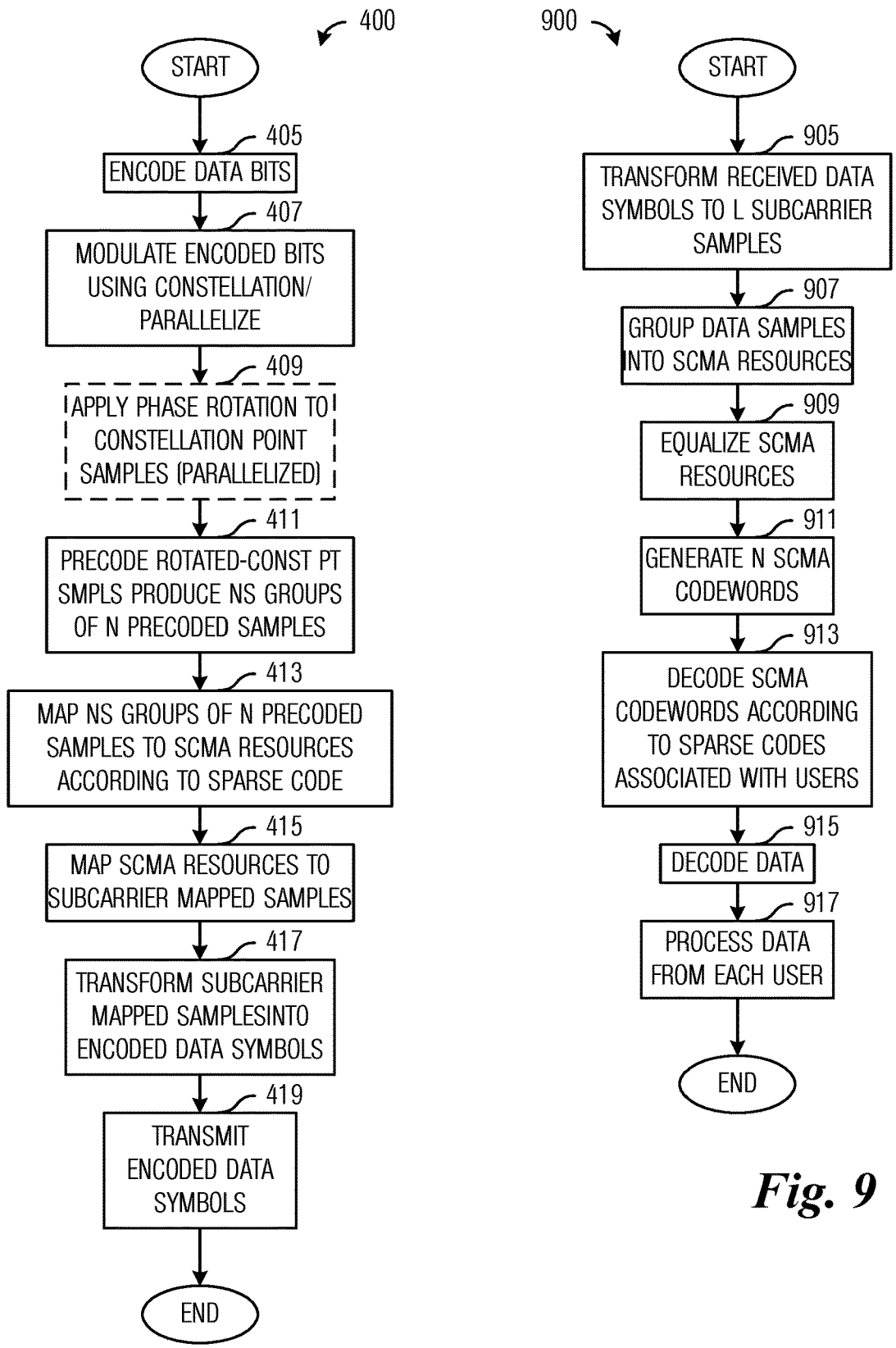
FIG. 4 illustrates a flow diagram of example operations occurring in a transmitting device utilizing a combined SCMA/SC-FDMA multiple access technique to transmit data according to example embodiments described herein.
FIG. 9 illustrates a flow diagram of example operations occurring in a receiving device utilizing a combined SCMA/SC-FDMA multiple access technique to receive data according to example embodiments described herein.

FIG. 4 illustrates a flow diagram of example operations 400 occurring in a transmitting device utilizing a combined SCMA/SC-FDMA multiple access technique to transmit data. Operations 400 may be indicative of operations occurring in a transmitting device, such as a UE in an uplink transmission, as the transmitting device uses the combined SCMA/SC-FDMA multiple access technique to transmit data.

Operations 400 begin with the transmitting device encoding data bits intended for a receiving device (block 405). The data bits may be encoded using a forward error correcting (FEC) code. As an example, a turbo encoder, a low-density parity-check (LDPC) encoder, or a polar encoder is used to encode the data bits. The transmitting device modulates the encoded bits using a constellation and parallelizes the modulated encoded bits (block 407). The modulation by the constellation produces a plurality of constellation point samples. The constellation may be one dimensional, for example. Alternatively, the constellation may be multidimensional. In general, the constellation may be p dimensional, where p is greater than or equal to one and is smaller than or equal to ns, where ns is the number of non-zero terms in a sparse code associated with the transmitting device. The plurality of constellation point samples is converted into a plurality of N-sample parallel blocks by a serial-to-parallel converter, where N is an integer representing a number of precoding samples (described below). A phase rotation may be applied to the plurality of N-sample parallel blocks (block 409). The phase rotation may be optional. In a situation where p is equal to one and ns is greater than one, multiple different phase rotations are applied to the plurality of N-sample parallel blocks. The phase rotations may be determined through simulation, specified in a technical standard, specified by an operator of the communications system, or through collaboration by the transmitting device and the receiving device. In a situation where p is equal to one and ns is greater than one, the plurality of N-sample parallel blocks are replicated ns−1 times.

The plurality of N-sample parallel blocks (after phase rotation if a phase rotation is applied to the encoded bits) is precoded to produce ns groups of N precoded samples (block 411). As an illustrative example, the precoding is performed by applying a Fourier transform to the plurality of constellation point samples. Examples of Fourier transforms include a Discrete Fourier transform (DFT) and a Fast Fourier transform (FFT). In the situation where the precoding comprises a DFT or an FFT, N is the length of the DFT or the FFT. In a situation where p is greater than one and ns is greater than p, an appropriate number of replications of the plurality of N-sample parallel blocks may be made (with or without phase rotation) and precoded to produce a total of ns groups of N precoded samples.

The transmitting device maps the ns groups of N precoded samples to K groups of SCMA resources, the total number of SCMA resources is K×N (block 413). In some embodiments, a group of SCMA resources is a group of subcarriers. The ns groups of N precoded samples are mapped to groups of SCMA resources in accordance with a sparse code associated with the transmitting device. As an illustrative example, consider a situation where p=2, K=4, s (the sparse code associated with the transmitting device)=1010, and ns=2, then a first group of N precoded samples is mapped to a first group of subcarriers associated with a first group of SCMA resources and a second group of N precoded samples is mapped to a third group of subcarriers associated with a third group of SCMA resources, while zeros are mapped to a second and fourth group of SCMA resources. The groups of SCMA resources are mapped to consecutive subcarriers to obtain a plurality of subcarrier-mapped samples (block 415). The mapping of the precoded samples associated with the SCMA resources to subcarriers that are consecutive in frequency (i.e., a set of consecutive elements at the input of an inverse Fourier transform) results in a signal with a low PAPR. The mapping generates a plurality of subcarrier-mapped samples from the ns groups of N precoded samples.

The plurality of subcarrier-mapped samples is transformed into encoded data symbols (block 417). As an illustrative example, the transforming of the plurality of subcarrier-mapped samples involves applying an inverse Fourier transform to the plurality of subcarrier-mapped samples. Examples of the inverse Fourier transforms include an inverse Discrete Fourier transform (iDFT) and an inverse Fast Fourier transform (iFFT). The transmitting device transmits the encoded data symbols (block 419).

Although the discussion of operations 400 focuses on an uplink transmission, the example embodiments presented herein are also operable with downlink transmissions. In a downlink transmission, where the transmitting device is an access node, the sparse code used to map the ns groups of N precoded samples to K groups of SCMA resources (in block 413 of operations 400, for example) is associated with the receiving device (e.g., a UE). The other aspects of operations 400 are as described above. Therefore the focus on uplink transmissions should not be construed as being limiting to either the scope or the spirit of the example embodiments.

In a first aspect, the present application provides a method for transmitting data. The method includes modulating, by a transmitting device, data bits with a constellation to produce modulated data symbols, precoding, by the transmitting device, the modulated data symbols to obtain ns groups of precoded samples, where ns is equal to a number of non-zero terms in a sparse code associated with the transmitting device, mapping, by the transmitting device, the ns groups of precoded samples to groups of subcarriers in accordance with the sparse code associated with the transmitting device, to obtain a plurality of subcarrier-mapped samples, transforming, by the transmitting device, the plurality of subcarrier-mapped samples into encoded data symbols, and transmitting, by the transmitting device, the encoded data symbols.

According to a first embodiment of the method according to the first aspect, the method includes applying, by the transmitting device, a phase rotation to the modulated data symbols prior to precoding the modulated data symbols. According to a second embodiment of the method according to any preceding embodiment of the first aspect or the first aspect as such, when ns is greater than one, the method further includes applying ns different phase rotations to the modulated data symbols. According to a third embodiment of the method according to any preceding embodiment of the first aspect or the first aspect as such, when the constellation is a single-dimensional constellation and ns is greater than one, the method further includes replicating, by the transmitting device, the group of precoded samples ns−1 times. According to a fourth embodiment of the method according to any preceding embodiment of the first aspect or the first aspect as such, the constellation is a p dimensional QAM constellation, where p is an integer equal to ns and ns is greater than one. According to a fifth embodiment of the method according to any preceding embodiment of the first aspect or the first aspect as such, mapping the ns groups of precoded samples to groups of subcarriers includes mapping a j-th group of precoded samples to subcarriers corresponding to a SCMA resource associated with a j-th non-zero term in the sparse code associated with the transmitting device. According to a sixth embodiment of the method according to any preceding embodiment of the first aspect or the first aspect as such, the subcarriers corresponding to the SCMA resource are a k-th group of consecutive subcarriers mapped to the SCMA resource associated with the j-th non-zero term.

Figure 5:
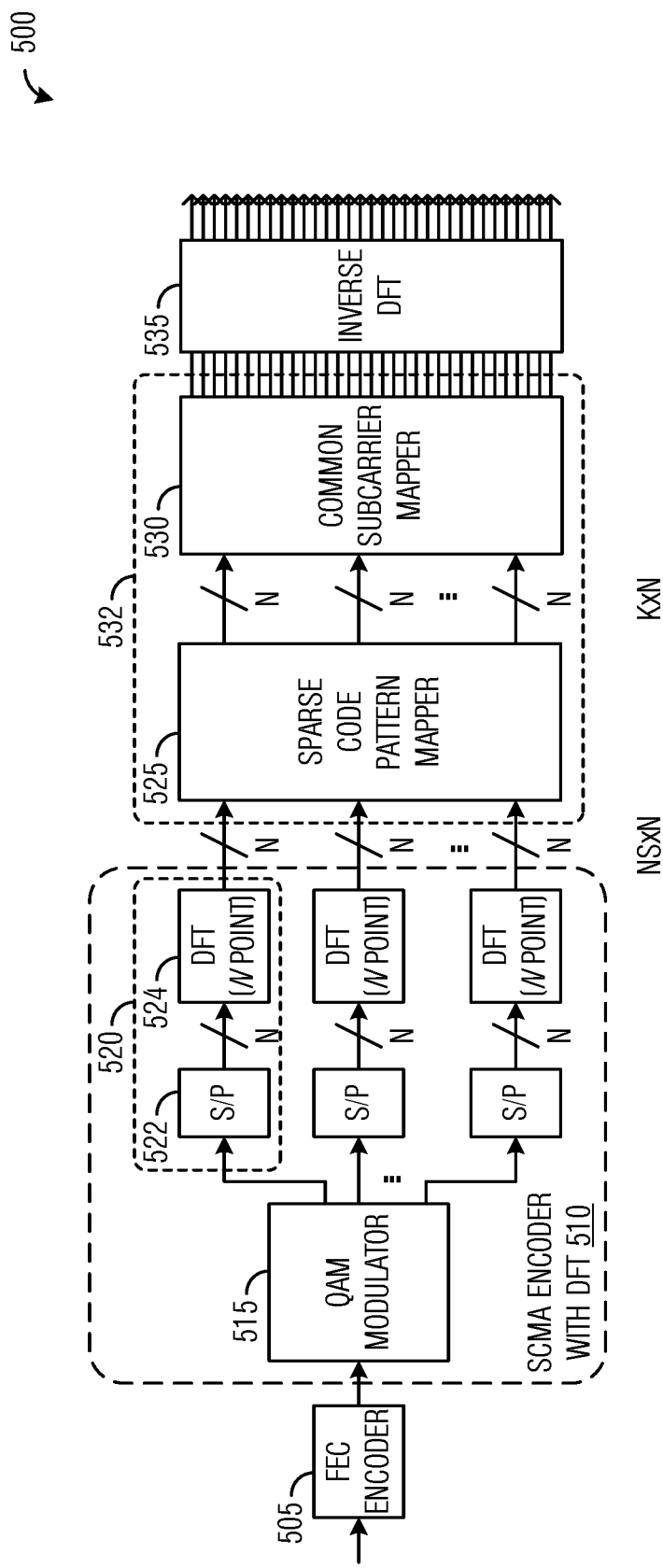
FIG. 5 illustrates a first example transmitter according to example embodiments described herein.

FIG. 5 illustrates a first example transmitter 500. Transmitter 500 may be an example implementation of a transmitter utilizing a combination SCMA/SC-FDMA multiple access technique. Transmitter 500 includes an FEC encoder 505 configured to encode data bits for a receiving device. As an illustrative example, FEC encoder 505 is implemented using a turbo encoder, an LPDC encoder, or a polar encoder. Transmitter 500 also includes an SCMA encoder with DFT unit 510. SCMA encoder with DFT unit 510 is configured to modulate the encoded bits, as well as precode the plurality of constellation point samples.

A QAM modulator 515 is configured to modulate the encoded data bits with a constellation, while ns precoders, such as precoder 520, precode the plurality of constellation point samples. As an example, each one of the ns precoders includes a serial to parallel converter (S/P), such as S/P 522, and an N point DFT, such as N point DFT 524. Output of a precoder is a group of N precoded samples.

Output of SCMA encoder with DFT 510 is provided to a sparse code pattern mapper 525, which is configured to map the ns groups of N precoded samples to K groups of SCMA resources in accordance with a sparse code associated with the transmitting device in an uplink transmission and the receiving device in a downlink transmission. As discussed previously, each group of SCMA resources is mapped to a group of subcarriers. The precoded samples associated with the K groups of SCMA resources are provided to a common subcarrier mapper 530, which is configured to map the K groups of SCMA resources to consecutive subcarriers to obtain a plurality of subcarrier-mapped samples. Sparse code pattern mapper 525 and common subcarrier mapper 530 are collectively referred to as a subcarrier mapper 532, which generates the plurality of subcarrier-mapped samples from the ns groups of N precoded samples. An inverse Fourier transform unit, such as an inverse DFT 535, transforms the plurality of subcarrier-mapped samples into encoded data symbols, which are transmitted.

Figure 6A:
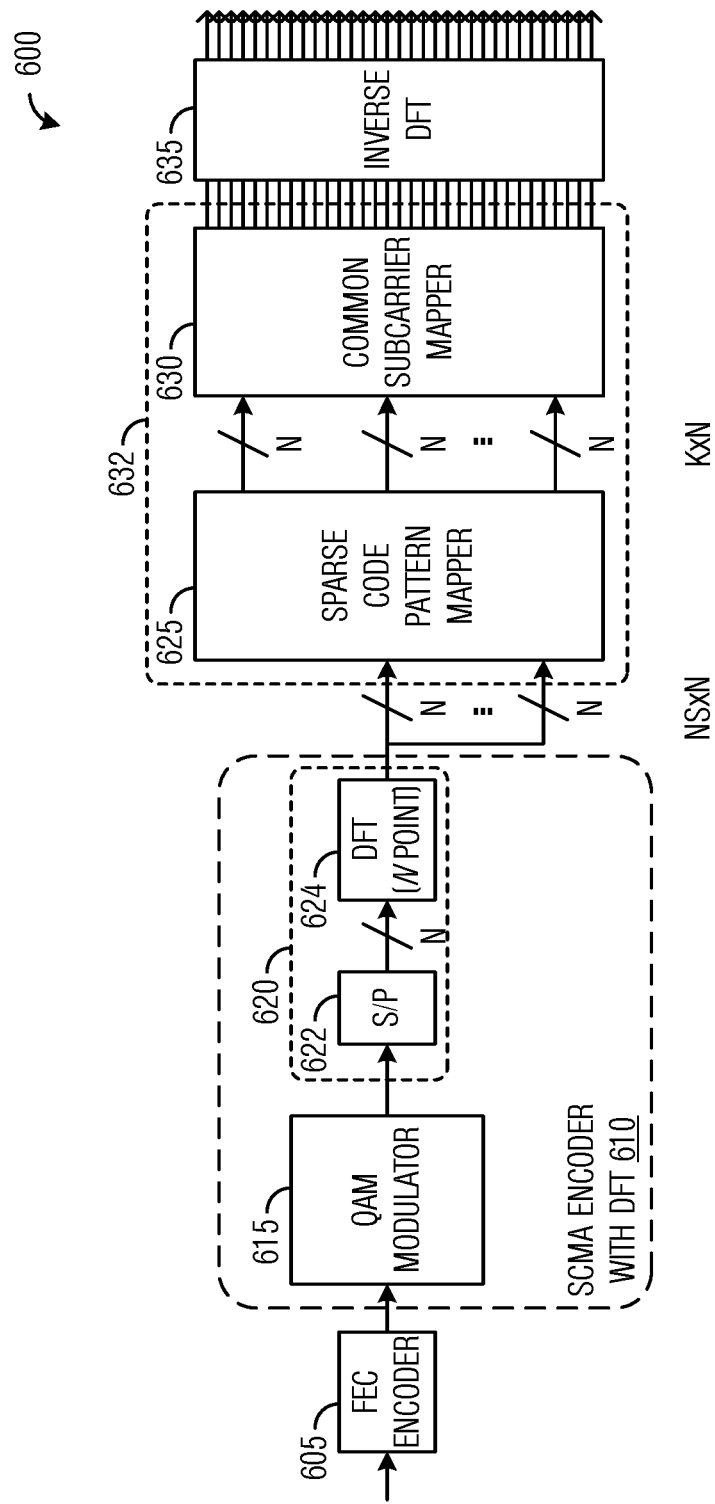
FIG. 6A illustrates a second example transmitter according to example embodiments described herein.

FIG. 6A illustrates a second example transmitter 600. Transmitter 600 may be an example implementation of a transmitter utilizing a combination SCMA/SC-FDMA multiple access technique. Transmitter 600 is configured to use a single-dimensional constellation (i.e., p is equal to one). Transmitter 600 includes an FEC encoder 605 configured to encode data bits for a user. Transmitter 600 also includes an SCMA encoder with DFT unit 610. SCMA encoder with DFT unit 610 is configured to modulate the encoded bits, as well as precode the plurality of constellation point samples.

A QAM modulator 615 is configured to modulate the encoded data bits with a single-dimensional constellation. Independent of the value of ns, SCMA encoder with DFT unit 610 includes a single precoder 620. Precoder 620 includes a S/P unit 622 and an N point DFT 624. Output of precoder 620 is replicated ns−1 times and provided to a sparse code pattern mapper 625, which is configured to map the ns groups of N precoded samples to K groups of SCMA resources in accordance with a sparse code associated with the transmitting device in an uplink transmission and the receiving device in a downlink transmission. As discussed previously, each group of SCMA resources is mapped to a group of subcarriers. The precoded samples associated with the K groups of SCMA resources are provided to a common subcarrier mapper 630, which is configured to map the K groups of SCMA resources to consecutive subcarriers to obtain a plurality of subcarrier-mapped samples. Sparse code pattern mapper 625 and common subcarrier mapper 630 are collectively referred to as a subcarrier mapper 632, which generates the plurality of subcarrier-mapped samples from the ns groups of N precoded samples. An inverse Fourier transform unit, such as an inverse DFT 635, is configured to transform the plurality of subcarrier-mapped samples into encoded data symbols, which are transmitted.

Figure 6B:
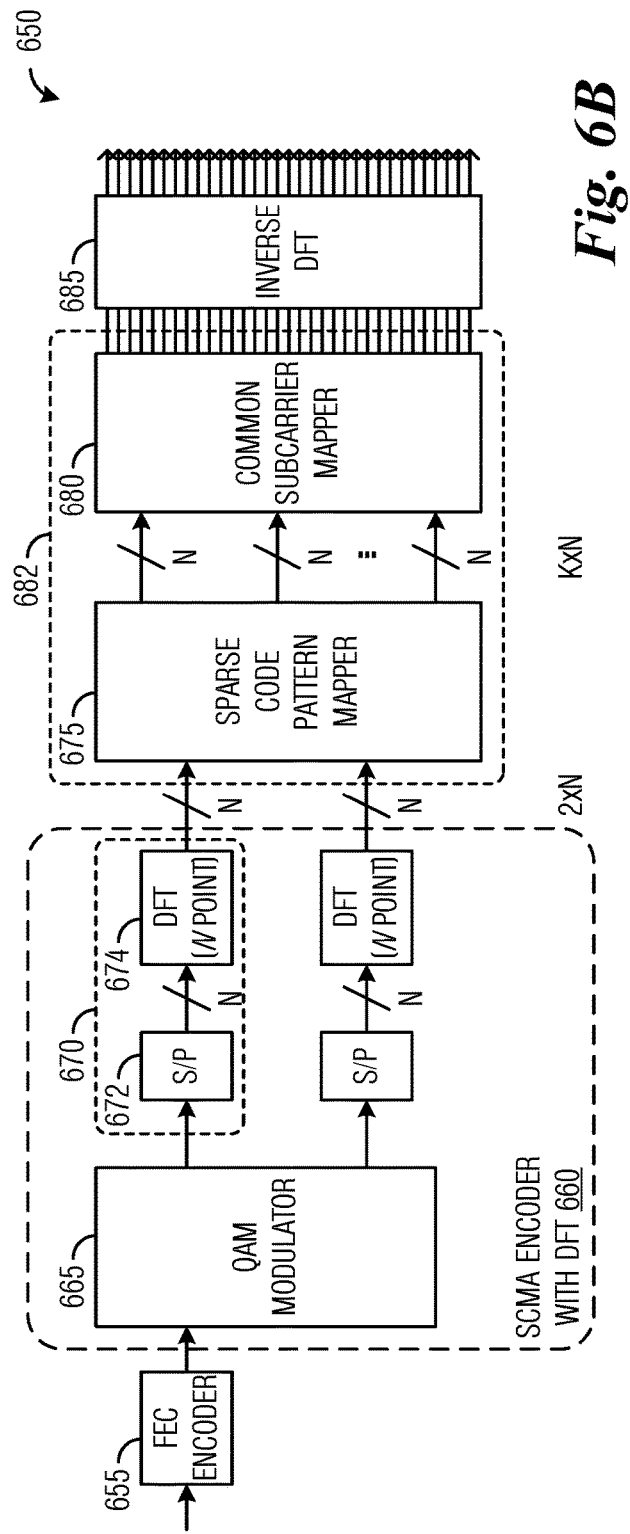
FIG. 6B illustrates a third example transmitter according to example embodiments described herein.

FIG. 6B illustrates a third example transmitter 650. Transmitter 650 may be an example implementation of a transmitter utilizing a combination SCMA/SC-FDMA multiple access technique. Transmitter 650 is configured to use a two-dimensional constellation (i.e., p is equal to two) and sparse codes with 2 non-zero terms (i.e., ns is equal to two). Transmitter 650 includes an FEC encoder 655 configured to encode data bits for a user. Transmitter 6500 also includes an SCMA encoder with DFT unit 660. SCMA encoder with DFT unit 660 is configured to modulate the encoded bits, as well as precode the plurality of constellation point samples.

A QAM modulator 665 is configured to modulate the encoded data bits with a two-dimensional constellation. SCMA encoder with DFT unit 610 includes two precoders, such as precoder 670. Precoder 670 includes a S/P unit 672 and an N point DFT 674. Output of precoder 670 is provided to a sparse code pattern mapper 675, which is configured to map the ns groups of N precoded samples to K groups of SCMA resources in accordance with a sparse code associated with the transmitting device in an uplink transmission and the receiving device in a downlink transmission. The precoded samples associated with the K groups of SCMA resources are provided to a common subcarrier mapper 680, which is configured to map the K groups of SCMA resources to consecutive subcarriers to obtain a plurality of subcarrier-mapped samples. Sparse code pattern mapper 675 and common subcarrier mapper 680 are collectively referred to as a subcarrier mapper 682, which generates the plurality of subcarrier-mapped samples from the ns groups of N precoded samples. An inverse Fourier transform unit, such as an inverse DFT 685, is configured to transform the plurality of subcarrier-mapped samples into encoded data symbols, which are transmitted.

Figure 6C:
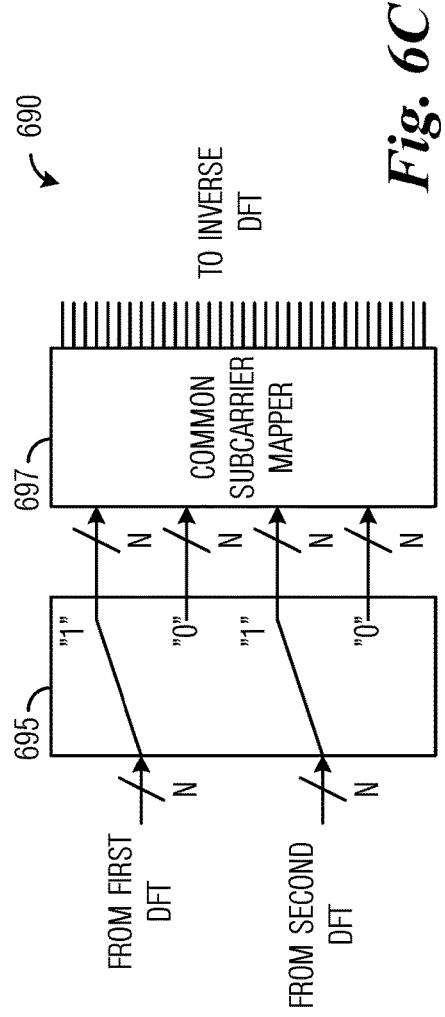
FIG. 6C illustrates a detailed view of an example subcarrier mapper according to example embodiments described herein.

FIG. 6C illustrates a detailed view of an example subcarrier mapper 690. Subcarrier mapper 690 is configured to use a length four sparse code (i.e., K is equal to four) with two non-zero terms (i.e., ns is equal to two). Specifically in the example shown in FIG. 6C, the sparse code is expressible as sequence 1 0 1 0.

Two groups of N precoded samples are mapped to four groups of SCMA resources by sparse code pattern mapper 695. As shown in FIG. 6C, a first group of N precoded samples (from a first DFT, for example) is mapped to a first non-zero group of SCMA resources and a second group of N precoded samples (from a second DFT, for example) is mapped to a second non-zero group of SCMA resources. Groups of SCMA resources corresponding to the zero terms may simply be provided zeroes. The precoded samples and zeroes associated with the four groups of SCMA resources (output from the sparse code pattern mapper 695) are provided to common subcarrier mapper 697, where the four groups of SCMA resources are mapped to consecutive subcarriers to obtain a plurality of subcarrier-mapped samples.

Figure 7:
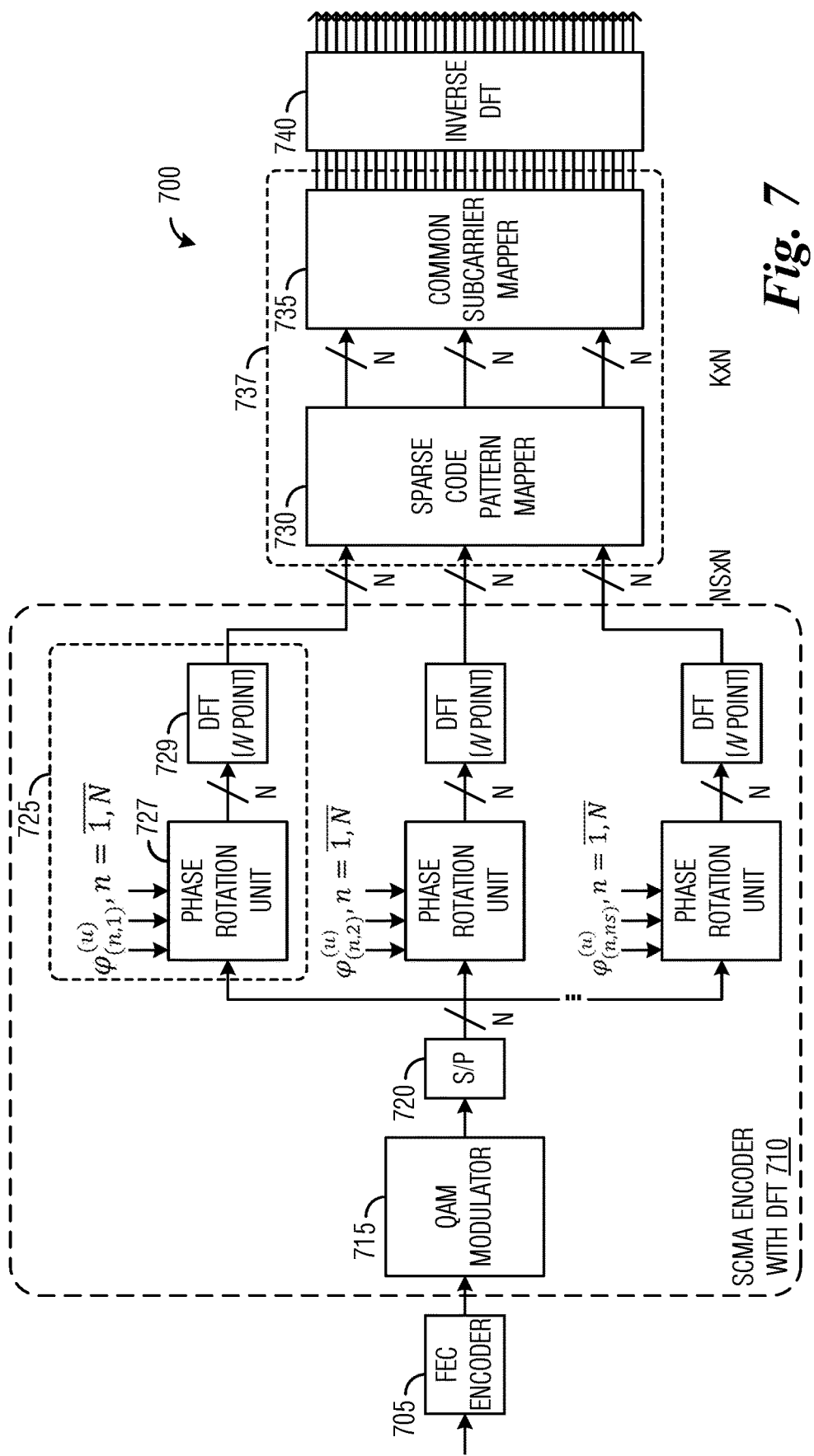
FIG. 7 illustrates a fourth example transmitter according to example embodiments described herein.

FIG. 7 illustrates a fourth example transmitter 700. Transmitter 700 may be an example implementation of a transmitter utilizing a combination SCMA/SC-FDMA multiple access technique. Transmitter 700 includes an FEC encoder 705 configured to encode data bits for a receiving device. Transmitter 700 also includes an SCMA encoder with DFT unit 710. SCMA encoder with DFT unit 710 is configured to modulate the encoded bits, as well as precode the plurality of constellation point samples.

SCMA encoder with DFT 710 includes a QAM modulator 715 that is configured to modulate the encoded data bits with a single-dimensional constellation, and a S/P 720. SCMA encoder with DFT 710 also includes ns phase-rotated precoders, such as phase-rotated precoder 725. Each of the ns phase-rotated precoders applies a unique phase rotation to the plurality of constellation point samples. Phase-rotated precoder 725 includes a phase rotation unit 727 and an N point DFT 729. In general, a phase rotation applied in an i-th phase rotation unit is expressible as $$\varphi_{(n,i)}^{(u)},$$

where $n=\overline{1,N}$, and u is a user index. The phase rotation is applied to the plurality of constellation points. Each phase rotation unit of each phase-rotated precoder applies a different phase rotation to the plurality of constellation point samples. The phase rotations help to further reduce the PAPR. The phase rotations may be determined through simulation, specified in a technical standard, specified by an operator of the communications system, or through collaboration by the transmitting device and a receiving device.

Outputs of SCMA encoder with DFT 710 are provided to a sparse code pattern mapper 730, which is configured to map the ns groups of N precoded samples to K groups of SCMA resources in accordance with a sparse code associated with the transmitting device in an uplink transmission and the receiving device in a downlink transmission. As discussed previously, each group of SCMA resources is mapped to a group of subcarriers. The precoded samples associated with the K groups of SCMA resources are provided to a common subcarrier mapper 735, which is configured to map the K groups of SCMA resources to consecutive subcarriers to obtain a plurality of subcarrier-mapped samples. Sparse code pattern mapper 730 and common subcarrier mapper 735 are collectively referred to as a subcarrier mapper 737, which generates the plurality of subcarrier-mapped samples from the ns groups of N precoded samples. An inverse Fourier transform unit, such as an inverse DFT 740, is configured to transform the plurality of subcarrier-mapped samples into encoded data symbols, which are transmitted.

Figure 8:
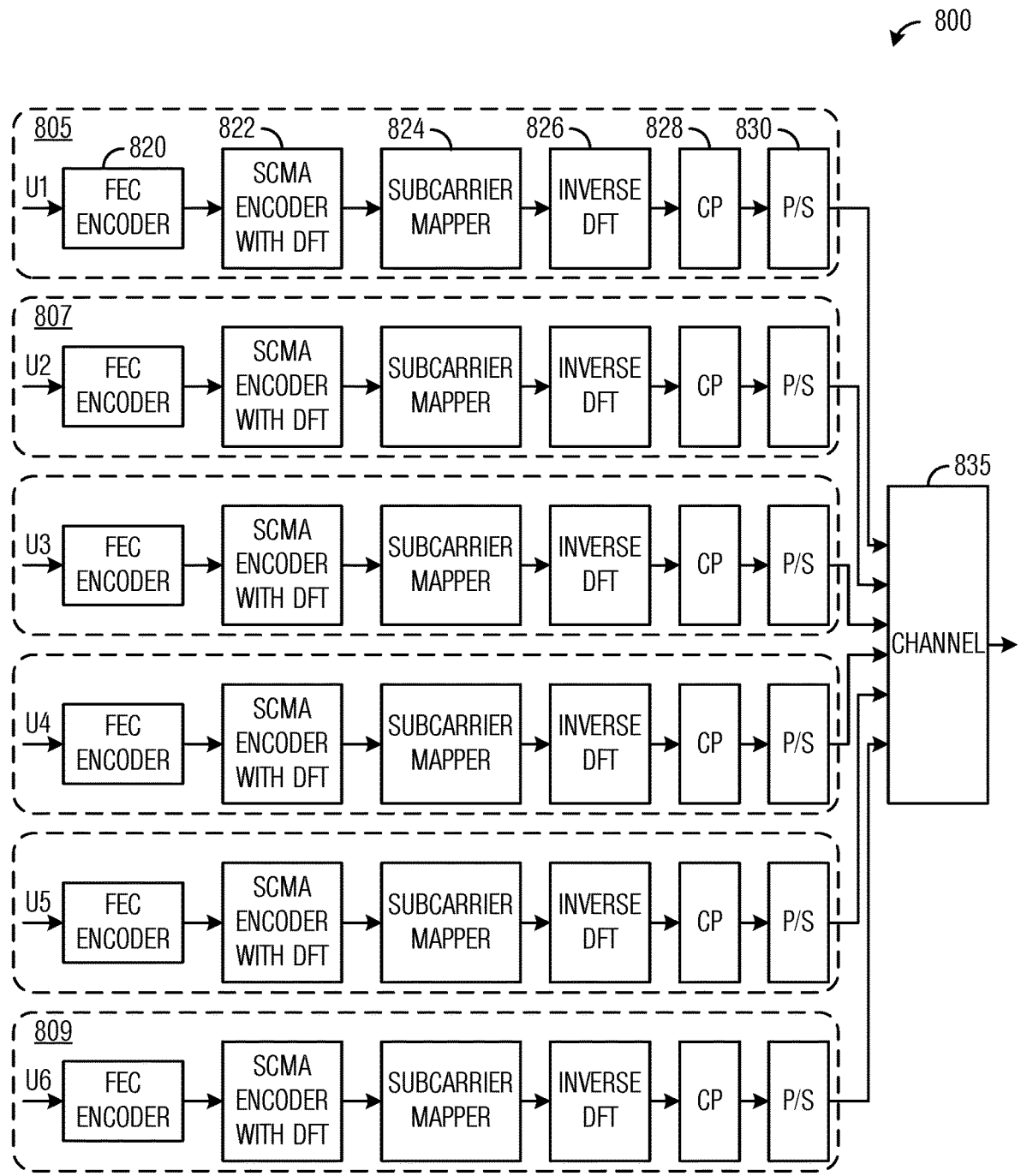
FIG. 8 illustrates an example transmitter utilizing a combination SCMA/SC-FDMA multiple access technique according to example embodiments described herein.

FIG. 8 illustrates an example transmitter 800 utilizing a combination SCMA/SC-FDMA multiple access technique. As configured, transmitter 800 supports 6 users and 4 SCMA resources. Therefore, a 150% data overload is supported. As shown in FIG. 8, an example SCMA code matrix used in transmitter 800 is expressible as $$S = \begin{bmatrix} s_1^{(1)} & s_1^{(2)} & s_1^{(3)} & 0 & 0 & 0 \\ s_2^{(1)} & 0 & 0 & s_2^{(4)} & s_2^{(5)} & 0 \\ 0 & s_3^{(2)} & 0 & s_3^{(4)} & 0 & s_3^{(6)} \\ 0 & 0 & s_4^{(3)} & 0 & s_4^{(5)} & s_4^{(6)} \end{bmatrix},$$

where $s_m^{(u)}$ is a non-zero element for device u at SCMA resource m. As shown in the SCMA code matrix above, the sparse code associated with each device has two non-zero terms (ns=2) and two zero terms.

For each device, there is an associated transmitter chain, such as transmitter chain 805 for a first device (U1), transmitter chain 807 for a second device (U2), and transmitter chain 809 for a sixth device (U6). Each transmitter chain includes similar components. As an illustrative example, transmitter chain 805 includes an FEC encoder 820, a SCMA encoder with DFT 822, a subcarrier mapper 824, an inverse DFT 826, a cyclic prefix (CP) unit 828, and a parallel to serial (P/S) unit 830). FEC encoder 820, SCMA encoder with DFT 822, subcarrier mapper 824, inverse DFT 826 are as described previously in discussion of transmitters of FIGS. 5, 6A, 6B, 6C, and 7. Each of the subcarrier mappers of the different transmitter chains are configured to map groups of precoded samples to consecutive subcarriers in accordance with the sparse code assigned to the subcarrier mapper in order to obtain a plurality of subcarrier-mapped samples. CP unit 828 is configured to add a cyclic prefix to encoded data symbols, while P/S unit 830 serializes the encoded data symbols with cyclic prefix for transmission on a channel 835.

FIG. 9 illustrates a flow diagram of example operations 900 occurring in a receiving device utilizing a combined SCMA/SC-FDMA multiple access technique to receive data. Operations 900 may be indicative of operations occurring in a receiving device, such as access point in an uplink transmission, as the receiving device uses the combined SCMA/SC-FDMA multiple access technique to receive data.

Operations 900 begin with the receiving device receiving data symbols and transforming the received data symbols to L subcarrier samples (block 905). The transforming may be achieved by applying a Fourier transform, such as a FFT or a DFT, to the received data symbols, where the Fourier transform is an L point Fourier transform, where L=K*N, with K being the number of groups of SCMA resources and N being the number of subcarriers per group of SCMA resources. The receiving device groups the subcarrier samples (block 907). The subcarrier samples may be grouped into K groups of N subcarrier samples each, with each group of N subcarrier samples corresponding to a group of SCMA resources.

The receiving device separately equalizes the N subcarrier samples associated with each SCMA resource (block 909). Because each SCMA resource may include data from more than one user, which are typically located in different locations, the channels between each user to the receiving device will generally differ. Therefore, the receiving device equalizes each group of N samples to equalize the channels between the different users and receiving device. As an illustrative example, the N samples associated with each SCMA resource may be provided to a frequency domain equalizer (FDE). A detailed discussion of an example FDE is provided below.

The receiving device generates N SCMA codewords from the equalized subcarrier samples (block 911). The generation of the N SCMA codewords may be accomplished by regrouping the subcarrier samples in the K groups of N subcarrier samples into N groups of K subcarrier samples, where each group of K subcarrier samples corresponds to a SCMA codeword. An example generation of a first SCMA codeword by the receiving device is as follows:

Place a first subcarrier sample of a first group of N subcarrier samples as a first subcarrier sample of a first group of K subcarrier samples;

Place a first subcarrier sample of a second group of N subcarrier samples as a second subcarrier sample of the first group of K subcarrier samples; and so on until Place a first subcarrier sample of a K-th group of N subcarrier samples as a K-th subcarrier sample of the first group of K subcarrier samples.

The receiving device decodes the N SCMA codewords in accordance with the sparse codes associated with the transmitting devices, producing encoded data bits (block 913). The receiving device may use a variety of suitable decoding algorithms for decoding SCMA codewords, such as a MPA to decode the SCMA codewords. The receiving device decodes the encoded data bits to produce data bits (block 915). The encoded data bits may have been encoded using an FEC code and a FEC decoder is used to decode the encoded data bits. As an example, a turbo decoder, an LDPC decoder, or a polar decoder is used to decode the encoded data bits. The receiving device processes the data bits from each user (block 917).

Although the discussion of operations 900 focuses on an uplink transmission, the example embodiments presented herein are also operable with downlink transmissions. In a downlink transmission, wherein the transmitting device is an access node, the sparse code used to decode the SCMA codewords (in block 913 of operations 900, for example) is associated with the receiving device, e.g., a UE. The other aspects of operations 900 are as described above. Therefore the focus on uplink transmissions should not be construed as being limiting to either the scope or the spirit of the example embodiments.

In a second aspect, the present application provides a method for receiving data. The method includes transforming, by a receiving device, data symbols received from a plurality of transmitting devices into a plurality of subcarrier samples, equalizing, by the receiving device, SCMA resources formed from the plurality of subcarrier samples, decoding, by the receiving device, SCMA codewords generated from the equalized SCMA resources to produce data bits associated with transmitting devices in the plurality of transmitting devices, and processing, by the receiving device, the data bits.

According to a first embodiment of the method according to the second aspect, the method includes applying a weighting matrix to the subcarrier samples associated with the SCMA resources. According to a second embodiment of the method according to any preceding embodiment of the second aspect or the second aspect as such, the method includes applying an MPA to the SCMA codewords.

Figure 10:
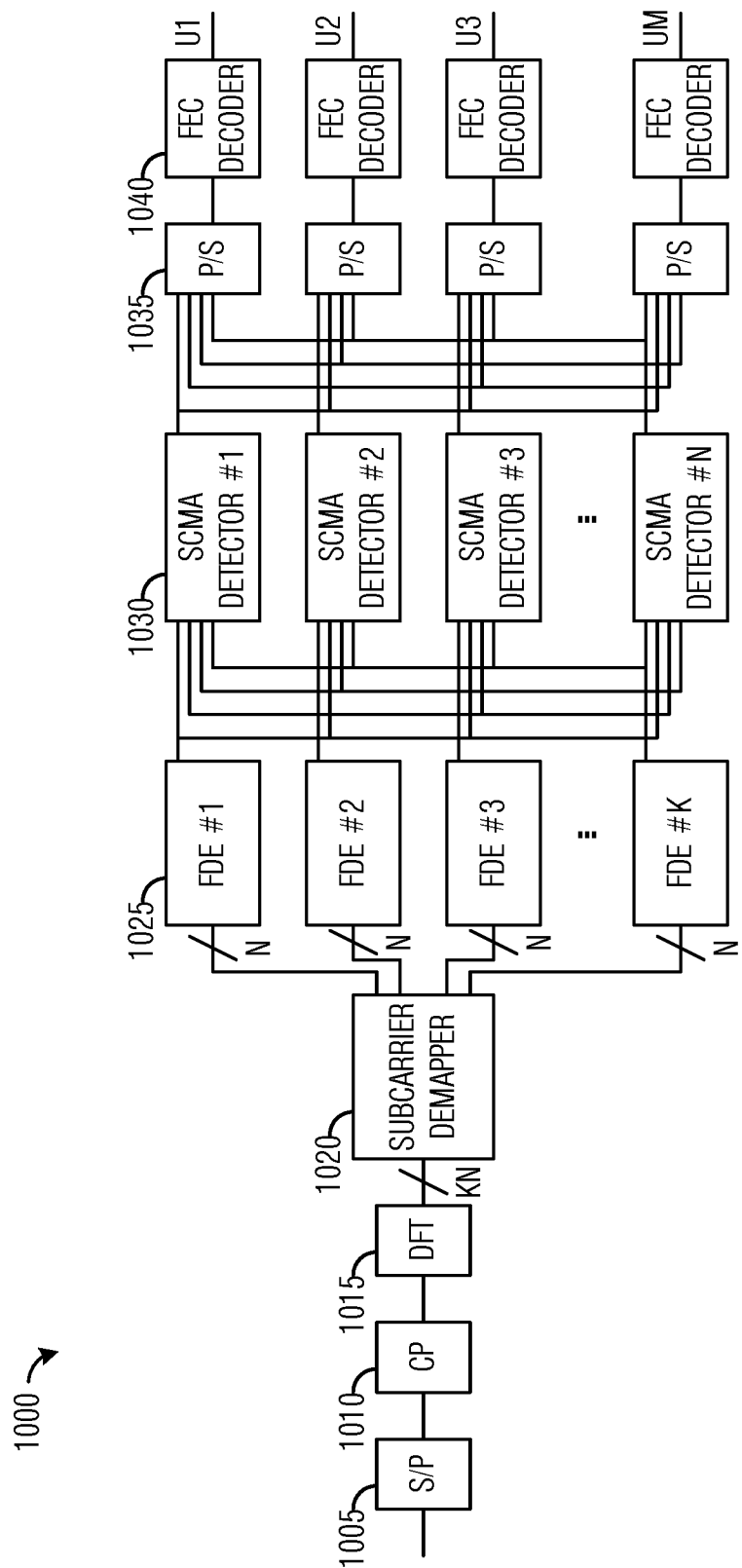
FIG. 10 illustrates an example receiver according to example embodiments described herein.

FIG. 10 illustrates an example receiver 1000. Receiver 1000 may be an example implementation of a receiver utilizing a combination SCMA/SC-FDMA multiple access technique. Receiver 1000 includes a S/P unit 1005 configured to parallelize received signals, a CP unit 1000 configured to remove a cyclic prefix inserted into the data symbols by the transmitting device, and a Fourier transform (e.g., a DFT) 1015 configured to transform the data symbols to produce L subcarrier samples. A subcarrier demapper 1020 is configured to group the L subcarrier samples into K groups of N subcarrier samples each, where K is the number of groups of SCMA resources and N is the number of subcarriers per group of SCMA resources.

The subcarriers per group of SCMA resources are provided to FDEs, such as FDE 1025, that are configured to equalize the subcarrier samples for the different channels between the receiver 1000 and respective transmitting devices. The equalized subcarriers are generated into N samples of the superposition of M SCMA codewords and provided to SCMA detectors, such as SCMA detector #1 1030, that are configured to decode the SCMA codewords using an appropriate decoding algorithm, such as MPA. The decoded SCMA codewords, i.e., encoded data bits, are provided to P/S units, such as P/S 1035, to serialize the encoded data bits and are decoded by FEC decoders, such as FEC decoder 1040. Output of the FEC decoders are data bits from respective users and are processed by the receiving device.

Figure 11:
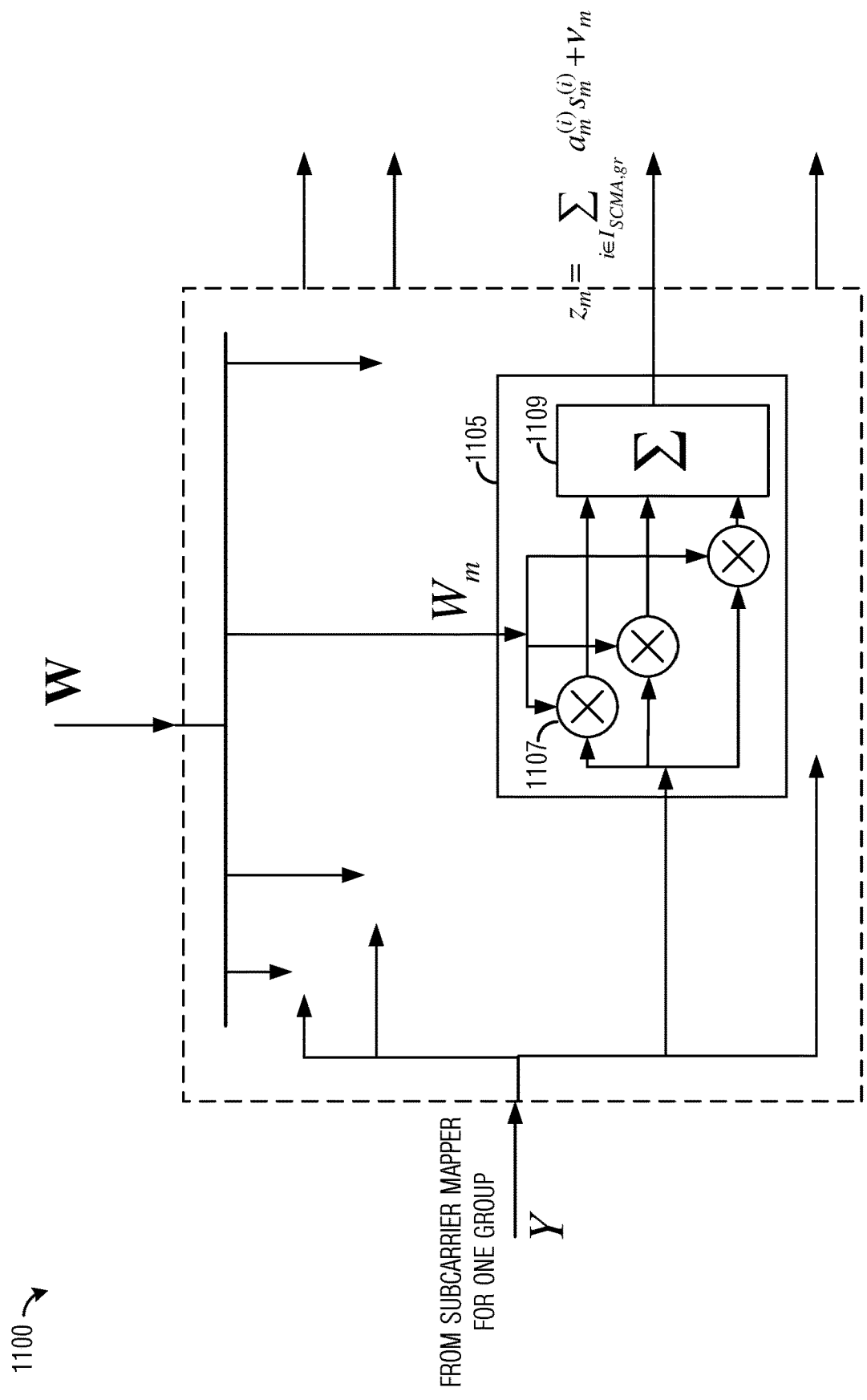
FIG. 11 illustrates an example FDE according to example embodiments described herein.

FIG. 11 illustrates an example FDE 1100. FDE 1100 may be an example implementation of the FDEs shown in FIG. 10. As discussed previously, FDE 1100 is configured to equalize a group of subcarriers provided by a subcarrier demapper. The operation of FDE 1100 may be expressed in mathematical terms as $$Z=WY,$$

where: Y is the receiver signal over a group of subcarriers expressible as $$Y=\Sigma_{i \in I_{SCMA,gr}} H^{(i)} F S^{(i)} + \eta,$$

$H^{(i)}$ is a diagonal channel matrix for i-th user,
F is a DFT matrix with dimension N×N, $$S^{(i)}=[s_1^{(i)} s_2^{(i)} \ldots s_l^{(i)}]^T,$$

$I_{SCMA,gr}$ is a number of uses in the group,
w is a weighting matrix that maximizes the value of $$\left( \frac{\text{power(Usefull signal)}}{\text{power(Interference+Noise)}} \right),$$

and
Individual elements of Z are expressible as $$z_m = \Sigma_{i \in I_{SCMA,gr}} W_m H^{(i)} F_m s_m^{(i)} + v_m,$$

with $\Sigma_{i \in I_{SCMA,gr}} W_m H^{(i)} F_m s_m^{(i)}$ representing the useful signal, and $v_m$ is the Interference+Noise.

FDE 1100 includes inputs W and Y, individual terms of which are provided to arithmetic units, such as arithmetic unit 1105. Arithmetic unit 1105 includes multipliers, such as multiplier 1107 that multiplies terms of $W_m$ and $Y_m$ and an adder 1109 combines the products of the multipliers, producing $z_m$.

In a third aspect, the present application provides a transmitting device. The transmitting device includes a processor, and a computer readable storage medium storing programming for execution by the processor. The programming including instructions to configure the transmitting device to modulate data bits with a constellation to produce modulated data symbols, precode the modulated data symbols to obtain ns groups of precoded samples, where ns is equal to a number of non-zero terms in a sparse code associated with the transmitting device, map the ns groups of precoded samples to groups of subcarriers in accordance with a sparse code associated with the transmitting device, to obtain a plurality of subcarrier-mapped samples, transform the plurality of subcarrier-mapped samples into encoded data symbols, and transmit the encoded data symbols.

According to a first embodiment of the transmitting device according to the third aspect, the transmitting device includes instructions to apply a phase rotation to the modulated data symbols prior to precoding the modulated data symbols. According to a second embodiment of the transmitting device according to any preceding embodiment of the third aspect or the third aspect as such, when ns is greater than one, the transmitting device further includes instructions to apply ns different phase rotations to the modulated data symbols. According to a third embodiment of the transmitting device according to any preceding embodiment of the third aspect or the third aspect as such, when the constellation is a single-dimensional constellation and ns is greater than one, the transmitting device further includes instructions to replicate the group of precoded samples ns−1 times. According to a fourth embodiment of the transmitting device according to any preceding embodiment of the third aspect or the third aspect as such, the constellation is a p dimensional QAM constellation, where p is an integer equal to ns and ns is greater than one. According to a fifth embodiment of the transmitting device according to any preceding embodiment of the third aspect or the third aspect as such, the transmitting device includes instructions to map a j-th group of precoded samples to subcarriers corresponding to a SCMA resource associated with a j-th non-zero term in the sparse code associated with the transmitting device. According to a sixth embodiment of the transmitting device according to any preceding embodiment of the third aspect or the third aspect as such, the subcarriers corresponding to the SCMA resource are a k-th group of consecutive subcarriers mapped to the SCMA resource associated with the j-th non-zero term.

In a fourth aspect, the present application provides a receiving device. The receiving device includes a processor, and a computer readable storage medium storing programming for execution by the processor. The programming including instructions to configure the receiving device to transform data symbols received from a plurality of transmitting devices into a plurality of subcarrier samples, equalize SCMA resources formed from the plurality of subcarrier samples, decode SCMA codewords generated from the equalized SCMA resources to produce data bits associated with transmitting devices in the plurality of transmitting devices, and process the data bits.

According to a first embodiment of the receiving device according to the fourth aspect, the receiving device includes instructions to apply a weighting matrix to the subcarrier samples associated with the SCMA resources. According to a second embodiment of the transmitting device according to any preceding embodiment of the fourth aspect or the fourth aspect as such, the receiving device includes instructions to apply an MPA to the SCMA codewords.

Figure 12:
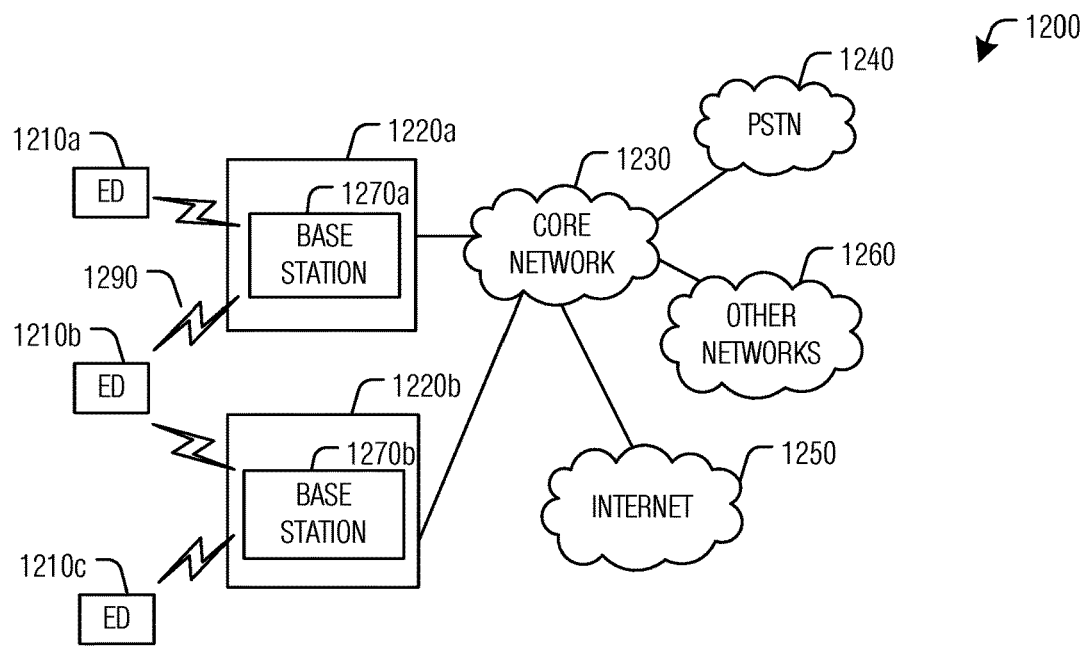
FIG. 12 illustrates an example communication system according to example embodiments described herein.

FIG. 12 illustrates an example communication system 1200. In general, the system 1200 enables multiple wireless or wired users to transmit and receive data and other content.

The system 1200 may implement one or more channel access methods, such as code division multiple access (CDMA), time division multiple access (TDMA), frequency division multiple access (FDMA), orthogonal FDMA (OFDMA), or single-carrier FDMA (SC-FDMA).

In this example, the communication system 1200 includes electronic devices (ED) 1210a-1210c, radio access networks (RANs) 1220a-1220b, a core network 1230, a public switched telephone network (PSTN) 1240, the Internet 1250, and other networks 1260. While certain numbers of these components or elements are shown in FIG. 12, any number of these components or elements may be included in the system 1200.

The EDs 1210a-1210c are configured to operate and/or communicate in the system 1200. For example, the EDs 1210a-1210c are configured to transmit and/or receive via wireless or wired communication channels. Each ED 1210a-1210c represents any suitable end user device and may include such devices (or may be referred to) as a user equipment/device, wireless transmit/receive unit (WTRU), mobile station, fixed or mobile subscriber unit, cellular telephone, personal digital assistant (PDA), smartphone, laptop, computer, touchpad, wireless sensor, or consumer electronics device.

The RANs 1220a-1220b here include base stations 1270a-1270b, respectively. Each base station 1270a-1270b is configured to wirelessly interface with one or more of the EDs 1210a-1210c to enable access to the core network 1230, the PSTN 1240, the Internet 1250, and/or the other networks 1260. For example, the base stations 1270a-1270b may include (or be) one or more of several well-known devices, such as a base transceiver station (BTS), a Node-B (NodeB), an evolved NodeB, a Home NodeB, a Home eNodeB, a site controller, an access point (AP), or a wireless router. The EDs 1210a-1210c are configured to interface and communicate with the Internet 1250 and may access the core network 1230, the PSTN 1240, and/or the other networks 1260.

In the embodiment shown in FIG. 12, the base station 1270a forms part of the RAN 1220a, which may include other base stations, elements, and/or devices. Also, the base station 1270b forms part of the RAN 1220b, which may include other base stations, elements, and/or devices. Each base station 1270a-1270b operates to transmit and/or receive wireless signals within a particular geographic region or area, sometimes referred to as a "cell." In some embodiments, multiple-input multiple-output (MIMO) technology may be employed having multiple transceivers for each cell.

The base stations 1270a-1270b communicate with one or more of the EDs 1210a-1210c over one or more air interfaces 1290 using wireless communication links. The air interfaces 1290 may utilize any suitable radio access technology.

It is contemplated that the system 1200 may use multiple channel access functionality, including such schemes as described above. In particular embodiments, the base stations and EDs implement LTE, LTE-A, and/or LTE-B. Of course, other multiple access schemes and wireless protocols may be utilized.

The RANs 1220a-1220b are in communication with the core network 1230 to provide the EDs 1210a-1210c with voice, data, application, Voice over Internet Protocol (VoIP), or other services. Understandably, the RANs 1220a-1220b and/or the core network 1230 may be in direct or indirect communication with one or more other RANs (not shown). The core network 1230 may also serve as a gateway access for other networks (such as the PSTN 1240, the Internet 1250, and the other networks 1260). In addition, some or all of the EDs 1210a-1210c may include functionality for communicating with different wireless networks over different wireless links using different wireless technologies and/or protocols. Instead of wireless communication (or in addition thereto), the EDs may communicate via wired communication channels to a service provider or switch (not shown), and to the Internet 1250.

Figure 13A:
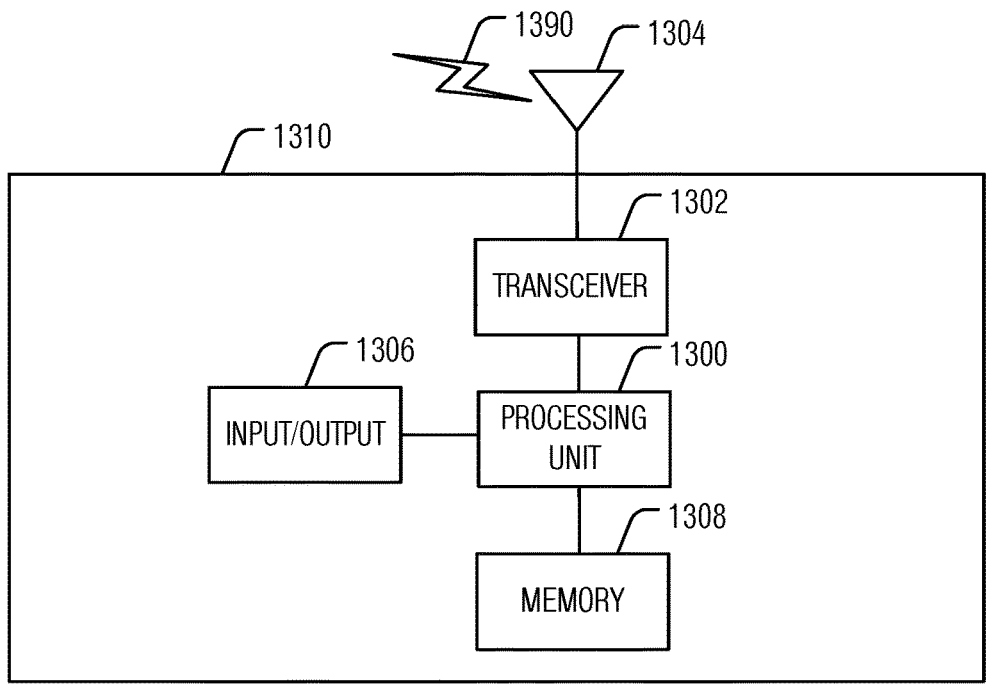
FIGS. 13A and 13B illustrate example devices that may implement the methods and teachings described herein.
Figure 13B:
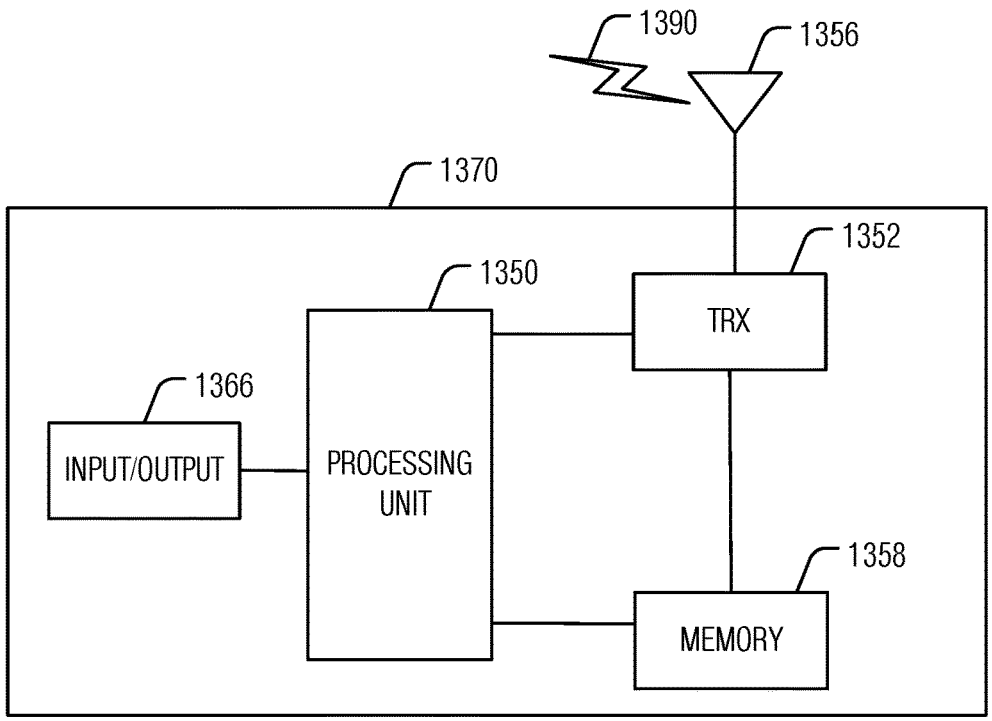

Although FIG. 12 illustrates one example of a communication system, various changes may be made to FIG. 12. For example, the communication system 1200 could include any number of EDs, base stations, networks, or other components in any suitable configuration. FIGS. 13A and 13B illustrate example devices that may implement the methods and teachings according to this disclosure. In particular, FIG. 13A illustrates an example ED 1310, and FIG. 13B illustrates an example base station 1370. These components could be used in the system 1200 or in any other suitable system.

As shown in FIG. 13A, the ED 1310 includes at least one processing unit 1300. The processing unit 1300 implements various processing operations of the ED 1310. For example, the processing unit 1300 could perform signal coding, data processing, power control, input/output processing, or any other functionality enabling the ED 1310 to operate in the system 1200. The processing unit 1300 also supports the methods and teachings described in more detail above. Each processing unit 1300 includes any suitable processing or computing device configured to perform one or more operations. Each processing unit 1300 could, for example, include a microprocessor, microcontroller, digital signal processor, field programmable gate array, or application specific integrated circuit.

The ED 1310 also includes at least one transceiver 1302. The transceiver 1302 is configured to modulate data or other content for transmission by at least one antenna or NIC (Network Interface Controller) 1304. The transceiver 1302 is also configured to demodulate data or other content received by the at least one antenna 1304. Each transceiver 1302 includes any suitable structure for generating signals for wireless or wired transmission and/or processing signals received wirelessly or by wire. Each antenna 1304 includes any suitable structure for transmitting and/or receiving wireless or wired signals. One or multiple transceivers 1302 could be used in the ED 1310, and one or multiple antennas 1304 could be used in the ED 1310. Although shown as a single functional unit, a transceiver 1302 could also be implemented using at least one transmitter and at least one separate receiver.

The ED 1310 further includes one or more input/output devices 1306 or interfaces (such as a wired interface to the Internet 1250). The input/output devices 1306 facilitate interaction with a user or other devices (network communications) in the network. Each input/output device 1306 includes any suitable structure for providing information to or receiving/providing information from a user, such as a speaker, microphone, keypad, keyboard, display, or touch screen, including network interface communications.

In addition, the ED 1310 includes at least one memory 1308. The memory 1308 stores instructions and data used, generated, or collected by the ED 1310. For example, the memory 1308 could store software or firmware instructions executed by the processing unit(s) 1300 and data used to reduce or eliminate interference in incoming signals. Each memory 1308 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 13B, the base station 1370 includes at least one processing unit 1350, at least one transceiver 1352, which includes functionality for a transmitter and a receiver, one or more antennas 1356, at least one memory 1358, and one or more input/output devices or interfaces 1366. A scheduler, which would be understood by one skilled in the art, is coupled to the processing unit 1350. The scheduler could be included within or operated separately from the base station 1370. The processing unit 1350 implements various processing operations of the base station 1370, such as signal coding, data processing, power control, input/output processing, or any other functionality. The processing unit 1350 can also support the methods and teachings described in more detail above. Each processing unit 1350 includes any suitable processing or computing device configured to perform one or more operations. Each processing unit 1350 could, for example, include a microprocessor, microcontroller, digital signal processor, field programmable gate array, or application specific integrated circuit.

Each transceiver 1352 includes any suitable structure for generating signals for wireless or wired transmission to one or more EDs or other devices. Each transceiver 1352 further includes any suitable structure for processing signals received wirelessly or by wire from one or more EDs or other devices. Although shown combined as a transceiver 1352, a transmitter and a receiver could be separate components. Each antenna 1356 includes any suitable structure for transmitting and/or receiving wireless or wired signals. While a common antenna 1356 is shown here as being coupled to the transceiver 1352, one or more antennas 1356 could be coupled to the transceiver(s) 1352, allowing separate antennas 1356 to be coupled to the transmitter and the receiver if equipped as separate components. Each memory 1358 includes any suitable volatile and/or non-volatile storage and retrieval device(s). Each input/output device 1366 facilitates interaction with a user or other devices (network communications) in the network. Each input/output device 1366 includes any suitable structure for providing information to or receiving/providing information from a user, including network interface communications.

Figure 14:
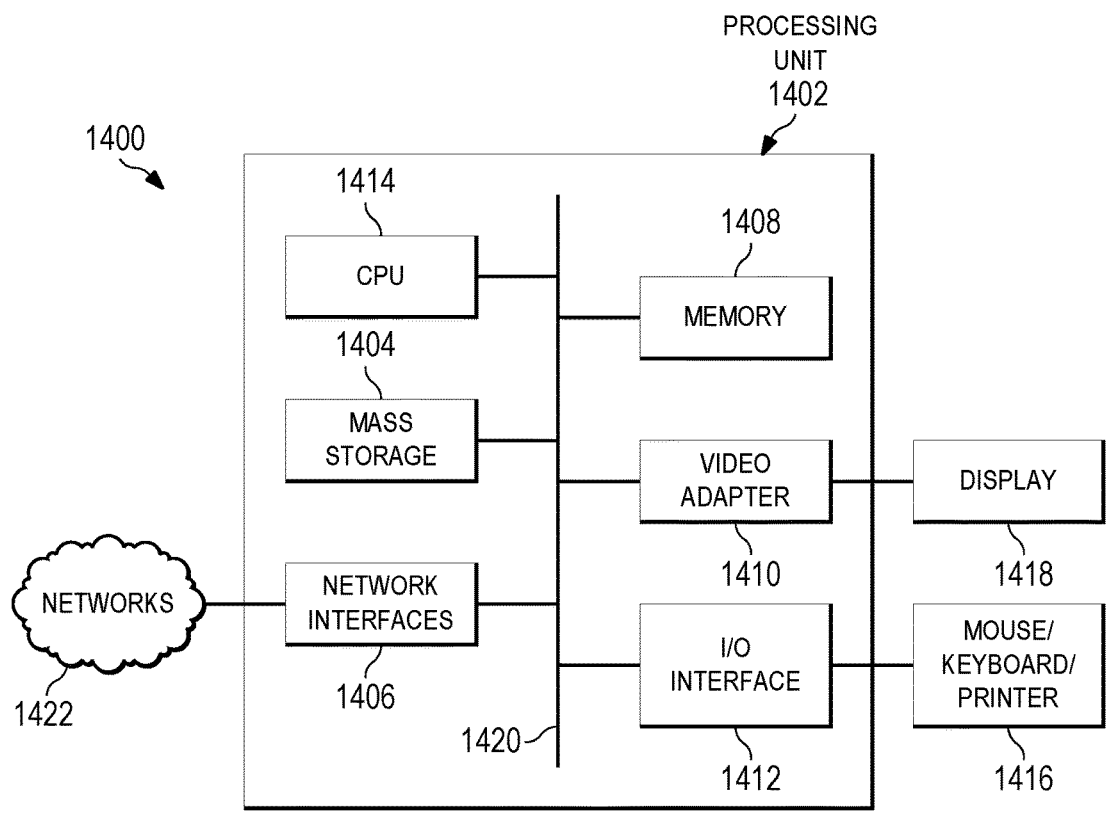
FIG. 14 is a block diagram of a computing system that may be used for implementing the devices and methods disclosed herein.

FIG. 14 is a block diagram of a computing system 1400 that may be used for implementing the devices and methods disclosed herein. For example, the computing system can be any entity of UE, AN, MM, SM, UPGW, AS. Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 1400 includes a processing unit 1402. The processing unit includes a central processing unit (CPU) 1414, memory 1408, and may further include a mass storage device 1404, a video adapter 1410, and an I/O interface 1412 connected to a bus 1420.

The bus 1420 may be one or more of any type of several bus architectures including a memory bus or memory controller, a peripheral bus, or a video bus. The CPU 1414 may comprise any type of electronic data processor. The memory 1408 may comprise any type of non-transitory system memory such as static random access memory (SRAM), dynamic random access memory (DRAM), synchronous DRAM (SDRAM), read-only memory (ROM), or a combination thereof. In an embodiment, the memory 1408 may include ROM for use at boot-up, and DRAM for program and data storage for use while executing programs.

The mass storage 1404 may comprise any type of non-transitory storage device configured to store data, programs, and other information and to make the data, programs, and other information accessible via the bus 1420. The mass storage 1404 may comprise, for example, one or more of a solid state drive, hard disk drive, a magnetic disk drive, or an optical disk drive.

The video adapter 1410 and the I/O interface 1412 provide interfaces to couple external input and output devices to the processing unit 1402. As illustrated, examples of input and output devices include a display 1418 coupled to the video adapter 1410 and a mouse/keyboard/printer 1416 coupled to the I/O interface 1412. Other devices may be coupled to the processing unit 1402, and additional or fewer interface cards may be utilized. For example, a serial interface such as Universal Serial Bus (USB) (not shown) may be used to provide an interface for an external device.

The processing unit 1402 also includes one or more network interfaces 1406, which may comprise wired links, such as an Ethernet cable, and/or wireless links to access nodes or different networks. The network interfaces 1406 allow the processing unit 1402 to communicate with remote units via the networks. For example, the network interfaces 1406 may provide wireless communication via one or more transmitters/transmit antennas and one or more receivers/receive antennas. In an embodiment, the processing unit 1402 is coupled to a local-area network 1422 or a wide-area network for data processing and communications with remote devices, such as other processing units, the Internet, or remote storage facilities.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a modulating unit/module, a precoding unit/module, a mapping unit/module, a transforming unit/module, an applying unit/module, an equalizing unit/module, a decoding unit/module, a processing unit/module, and/or a replicating unit/module. The respective units/modules may be hardware, software, or a combination thereof. For instance, one or more of the units/modules may be an integrated circuit, such as field programmable gate arrays (FPGAs) or application-specific integrated circuits (ASICs).

Although the present disclosure and its advantages have been described in detail, it should be understood that various changes, substitutions and alterations can be made herein without departing from the spirit and scope of the disclosure as defined by the appended claims.

What is claimed is:

1. A method for transmitting a signal, the method comprising:

modulating, by a transmitting device, binary bits with a constellation to produce modulated symbols;

precoding, by the transmitting device, the modulated symbols to obtain ns groups of precoded samples, wherein ns is greater than one;

mapping, by the transmitting device, the ns groups of precoded samples to groups of subcarriers in accordance with a sparse pattern to obtain a plurality of subcarrier-mapped samples; and transmitting, by the transmitting device, the signal generated from the plurality of subcarrier-mapped samples.

2. The method of claim 1, further comprising applying, by the transmitting device, a phase rotation to the modulated symbols prior to precoding the modulated symbols.

3. The method of claim 2, wherein applying the phase rotation to the modulated symbols comprises applying ns different phase rotations to the modulated symbols.

4. The method of claim 1, wherein the constellation is a single-dimensional constellation, and wherein the method further comprises replicating, by the transmitting device, the ns groups of precoded samples ns−1 times.

5. The method of claim 1, wherein the constellation is a p dimensional QAM constellation, where p is an integer equal to ns.

6. The method of claim 1, wherein mapping the ns groups of precoded samples to the groups of subcarriers comprises mapping a j-th group of precoded samples to subcarriers corresponding to a sparse code multiple access (SCMA) resource associated with a j-th non-zero term in the sparse pattern.

7. The method of claim 6, wherein the subcarriers corresponding to the SCMA resource are a k-th group of consecutive subcarriers mapped to the SCMA resource associated with the j-th non-zero term.

8. A method for receiving data, the method comprising:
transforming, by a receiving device, data symbols received from a plurality of transmitting devices into a plurality of subcarrier samples;
equalizing, by the receiving device, sparse code multiple access (SCMA) resources formed from the plurality of subcarrier samples; and
decoding, by the receiving device, SCMA codewords generated from the equalized SCMA resources to produce data bits associated with transmitting devices in the plurality of transmitting devices.

9. The method of claim 8, wherein equalizing the SCMA resources comprises applying a weighting matrix to the subcarrier samples associated with the SCMA resources.

10. The method of claim 8, wherein decoding the SCMA codewords comprises applying a message passing algorithm (MPA) to the SCMA codewords.

11. A transmitting device comprising:
a processor; and
a computer readable storage medium storing programming for execution by the processor, the programming including instructions to configure the transmitting device to:
modulate binary bits with a constellation to produce modulated symbols,
precode the modulated symbols to obtain ns groups of precoded samples, where ns is greater than one,
map the ns groups of precoded samples to groups of subcarriers in accordance with a sparse pattern to obtain a plurality of subcarrier-mapped samples, and
transmit a signal generated from the plurality of subcarrier-mapped samples.

12. The transmitting device of claim 11, wherein the programming includes instructions to configure the transmitting device to apply a phase rotation to the modulated symbols prior to precoding the modulated symbols.

13. The transmitting device of claim 12, wherein the programming includes instructions to configure the transmitting device to apply ns different phase rotations to the modulated symbols.

14. The transmitting device of claim 11, wherein the constellation is a single-dimensional constellation, and wherein the programming includes instructions to configure the transmitting device to replicate the ns groups of precoded samples ns−1 times.

15. The transmitting device of claim 11, wherein the constellation is a p dimensional QAM constellation, where p is an integer equal to ns.

16. The transmitting device of claim 11, wherein the programming includes instructions to configure the transmitting device to map a j-th group of precoded samples to subcarriers corresponding to a sparse code multiple access (SCMA) resource associated with a j-th non-zero term in the sparse pattern.

17. The transmitting device of claim 16, wherein the subcarriers corresponding to the SCMA resource are a k-th group of consecutive subcarriers mapped to the SCMA resource associated with the j-th non-zero term.

* * * * *